(12) United States Patent
Hole et al.

(10) Patent No.: US 9,001,649 B2
(45) Date of Patent: Apr. 7, 2015

(54) METHODS AND APPARATUS TO COMMUNICATE DATA BETWEEN A WIRELESS NETWORK AND A MOBILE STATION

(75) Inventors: David Philip Hole, Southampton (GB); Christopher Harris Snow, Kitchener (CA); Ayman Ahmed Abdel-Samad, Waterloo (CA); Dinesh Kumar Arora, Kitchener (CA); Nazih Almalki, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 608 days.

(21) Appl. No.: 12/841,868

(22) Filed: Jul. 22, 2010

(65) Prior Publication Data

US 2012/0020305 A1    Jan. 26, 2012

(51) Int. Cl.
*H04W 72/04*    (2009.01)

(52) U.S. Cl.
CPC .................................. *H04W 72/048* (2013.01)

(58) Field of Classification Search
USPC ......................................... 370/231, 329, 337
See application file for complete search history.

(56) References Cited

U.S. PATENT DOCUMENTS

| | | | |
|---|---|---|---|
| 6,031,827 A | 2/2000 | Rikkinen et al. | |
| 6,041,241 A | 3/2000 | Wiley | |
| 6,356,759 B1 | 3/2002 | Mustajarvi | |
| 6,795,419 B2 * | 9/2004 | Parantainen et al. | 370/337 |
| 7,158,495 B2 | 1/2007 | Jei | |
| 7,181,223 B1 | 2/2007 | Pecen et al. | |
| 7,362,725 B2 | 4/2008 | Lintulampi et al. | |
| 7,492,736 B2 | 2/2009 | Ho | |
| 7,603,132 B2 | 10/2009 | Sim et al. | |

(Continued)

FOREIGN PATENT DOCUMENTS

| | | |
|---|---|---|
| EP | 1418710 | 5/2004 |
| EP | 2056502 | 5/2009 |

(Continued)

OTHER PUBLICATIONS etutorials.org, "Chapter 3.3: Radio Interface," retrieved from http://www.etutorials.org/Mobile+devices/gprs+mobile +internet/Chapter+3+Overview+of+GPRS/Radio+Interface/ on Jul. 8, 2010, 8 pages.

(Continued)

*Primary Examiner* — Donald Mills
*Assistant Examiner* — Henry Baron
(74) *Attorney, Agent, or Firm* — Fish & Richardson P.C.

(57) ABSTRACT

Example methods and apparatus to communicate data between a wireless network and a mobile station are disclosed. A disclosed example method involves identifying a first quantity of resources for use in communicating first data to a mobile station in a first radio block period and a second quantity of resources for use in communicating second data to the mobile station in a second radio block period. The total quantity of the first and second quantities of resources comply with a maximum allowable quantity of resources specified for a plurality of radio block periods including the first and second radio block periods. The example method also involves sending, to the mobile station, the first data in the first quantity of resources during the first radio block period and the second data in the second quantity of resources during the second radio block period.

20 Claims, 16 Drawing Sheets

1-IN-3 DOWNLINK RADIO BLOCK ASSIGNMENT WITH UPLINK STATE FLAG (USF) COMMUNICATION

(56) References Cited

U.S. PATENT DOCUMENTS

| | | | |
|---|---|---|---|
| 8,023,461 | B2 | 9/2011 | Lintulampi et al. |
| 8,218,494 | B2 | 7/2012 | Conway et al. |
| 8,745,231 | B2 | 6/2014 | Hole et al. |
| 8,830,981 | B2 | 9/2014 | Hole et al. |
| 8,837,388 | B2 | 9/2014 | Hole et al. |
| 2005/0105503 | A1 | 5/2005 | Cayla et al. |
| 2005/0180324 | A1 | 8/2005 | Niemela et al. |
| 2005/0180325 | A1 | 8/2005 | Niemela et al. |
| 2006/0221908 | A1 | 10/2006 | Hoshina |
| 2007/0211667 | A1 | 9/2007 | Agrawal et al. |
| 2008/0056303 | A1 | 3/2008 | Sebire et al. |
| 2008/0232287 | A1 | 9/2008 | Shao et al. |
| 2008/0259800 | A1 | 10/2008 | Clark et al. |
| 2008/0259880 | A1* | 10/2008 | Parolari et al. ............ 370/337 |
| 2008/0279211 | A1 | 11/2008 | Chitrapu et al. |
| 2009/0016230 | A1 | 1/2009 | Choi |
| 2009/0086686 | A1 | 4/2009 | Rudolf et al. |
| 2009/0098866 | A1 | 4/2009 | Timner et al. |
| 2009/0135773 | A1 | 5/2009 | Aghili et al. |
| 2009/0238130 | A1 | 9/2009 | Nakatsugawa |
| 2010/0027446 | A1 | 2/2010 | Choi et al. |
| 2010/0091744 | A1 | 4/2010 | Ruohonen et al. |
| 2010/0110946 | A1 | 5/2010 | Diachina et al. |
| 2010/0195614 | A1 | 8/2010 | Nimbalker et al. |
| 2010/0238891 | A1 | 9/2010 | Conway et al. |
| 2010/0238910 | A1 | 9/2010 | Conway et al. |
| 2010/0238915 | A1 | 9/2010 | Cayla et al. |
| 2010/0322132 | A1 | 12/2010 | Ramakrishna et al. |
| 2011/0051661 | A1 | 3/2011 | Venkob et al. |
| 2011/0051672 | A1 | 3/2011 | Lee et al. |
| 2011/0200019 | A1* | 8/2011 | Manbo et al. ............ 370/336 |
| 2011/0222489 | A1 | 9/2011 | Awad |
| 2012/0014269 | A1 | 1/2012 | Ray et al. |
| 2012/0020304 | A1 | 1/2012 | Hole et al. |
| 2012/0020306 | A1 | 1/2012 | Hole et al. |
| 2012/0020338 | A1 | 1/2012 | Hole et al. |
| 2012/0021752 | A1 | 1/2012 | Hole et al. |
| 2012/0023235 | A1 | 1/2012 | Hole et al. |
| 2012/0051356 | A1 | 3/2012 | Hole |
| 2012/0093009 | A1 | 4/2012 | Wang et al. |
| 2012/0236833 | A1 | 9/2012 | Conway et al. |
| 2012/0327926 | A1 | 12/2012 | Cayla et al. |
| 2013/0051374 | A1 | 2/2013 | Faurie |
| 2013/0315224 | A1 | 11/2013 | Cayla et al. |

FOREIGN PATENT DOCUMENTS

| | | |
|---|---|---|
| GB | 2464987 | 5/2010 |
| WO | 98/26625 | 6/1998 |
| WO | 98/37706 | 8/1998 |
| WO | 02/09463 | 1/2002 |
| WO | 2006/111014 | 10/2006 |
| WO | 2007120090 | 10/2007 |
| WO | 2008069950 | 6/2008 |
| WO | 2008095748 | 8/2008 |
| WO | 2008115003 | 9/2008 |

OTHER PUBLICATIONS etutorials.org, "Chapter 5.5: Radio Resource Allocation," retrieved from http://www.etutorials.org/Mobile+devices/gprs+mobile+internet/Chapter+5+Radio+Interface+RLC+MAC+Layer/Radio+Resource+Allocation/ on Jul. 9, 2010, 19 pages.

3rd Generation Partnership Project (3GPP), "3GPP TS 45.002—Technical Specification Group GSM/EDGE Radio Access Network; Multiplexing and multiple access on the radio path (Release 9)," V9.3.0, Apr. 6, 2010, 112 pages.

3rd Generation Partnership Project (3GPP), "3GPP TS 44.060—Technical Specification Group GSM/EDGE Radio Access Network; General Packet Radio Service (GPRS); Mobile Station (MS)—Base Station System (BSS) interface; Radio Link Control/ Medium Access Control (RLC/MAC) protocol (Release 10)," V10.1.0, Jun. 14, 2010, 613 pages.

3rd Generation Partnership Project (3GPP), "3GPP TS 44.018—Technical Specification Group GSM/EDGE Radio Access Network; Mobile radio interface layer 3 specification; Radio Resource control (RRC) protocol (Release 9)," V9.5.0, Jun. 14, 2010, 429 pages.

3rd Generation Partnership Project (3GPP), "3GPP TS 24.008—Technical Specification Group Core Network and Terminals; Mobile radio interface layer 3 specification; Core network protocols; Stage 3 (Release 9)," V9.3.0, Jun. 15, 2010, 611 pages.

3rd Generation Partnership Project (3GPP), "3GPP TS 04.60—Technical Specification Group GSM/EDGE Radio Access Network; General Packet Radio Service (GPRS); Mobile Station (MS)— Base Station (BSS) interface; Radio Link Control/ Medium Access Control (RLC/MAC) protocol (Release 1999)," V8.27.0, Sep. 16, 2005, 315 pages.

Telefon AB LM Ericsson, "Enhanced Flexible Timeslot Assignment," 3GPP DRAFT; GP-081901, 3rd Generation Partnership Project (3GPP), Mobile Competence Centre; Miami, Nov. 19, 2008, 5 pages.

Patent Cooperation Treaty, "International Search Report," issued by the International Searching Authority in connection with PCT application No. PCT/IB2011/052883, mailed Oct. 24, 2011 (4 pages).

Patent Cooperation Treaty, "Written Opinion of the International Searching Authority," issued by the International Searching Authority in connection with PCT/IB2011/052883, mailed Oct. 24, 2011 (5 pages).

Patent Cooperation Treaty, "International Search Report," issued by the International Searching Authority in connection with PCT application No. PCT/IB2011/052884, mailed Oct. 24, 2011 (4 pages).

Patent Cooperation Treaty, "Written Opinion of the International Searching Authority," issued by the International Searching Authority in connection with PCT/IB2011/052884, mailed Oct. 24, 2011 (5 pages).

Patent Cooperation Treaty, "International Search Report," issued by the International Searching Authority in connection with PCT application No. PCT/IB2011/052886, mailed Dec. 1, 2011 (3 pages).

Patent Cooperation Treaty, "Written Opinion of the International Searching Authority," issued by the International Searching Authority in connection with PCT/IB2011/052886, mailed Dec. 1, 2011 (5 pages).

Patent Cooperation Treaty, "International Search Report," issued by the International Searching Authority in connection with PCT application No. PCT/IB2011/052888, mailed Dec. 6, 2011 (4 pages).

Patent Cooperation Treaty, "Written Opinion of the International Searching Authority," issued by the International Searching Authority in connection with PCT/IB2011/052888, mailed Dec. 6, 2011 (10 pages).

Patent Cooperation Treaty, "International Search Report," issued by the International Searching Authority in connection with PCT application No. PCT/IB2011/052891, mailed Feb. 13, 2012 (6 pages).

Patent Cooperation Treaty, "Written Opinion of the International Searching Authority," issued by the International Searching Authority in connection with PCT/IB2011/052891, mailed Feb. 13, 2012 (12 pages).

Patent Cooperation Treaty, "International Search Report," issued by the International Searching Authority in connection with PCT application No. PCT/IB2011/052893, mailed Feb. 13, 2012 (6 pages).

Patent Cooperation Treaty, "Written Opinion of the International Searching Authority," issued by the International Searching Authority in connection with PCT/IB2011/052893, mailed Feb. 13, 2012 (12 pages).

Nokia Corporation et al., "Dynamic Timeslot Reduction," 3GPP DRAFT; GP-091422, 3rd Generation Partnership Project (3GPP), Mobile Competence Centre; Aug. 26, 2009, 16 pages.

Rohde and Schwarz, "Receiver Measurements on GPRS and EGPRS Mobile Phones," [retrieved from http://www2.rohde-schwarz.com/file/n176_cmu200.pdf on Oct. 10, 2011] Dec. 31, 2002, 4 pages.

Patent Cooperation Treaty, "International Preliminary Report on Patentability," issued by the International Searching Authority in connection with PCT application No. PCT/IB2011/052883, mailed Jan. 22, 2013 (5 pages).

(56) References Cited

OTHER PUBLICATIONS

Patent Cooperation Treaty, "International Preliminary Report on Patentability," issued by the International Searching Authority in connection with PCT application No. PCT/IB2011/052884, mailed Jan. 22, 2013 (5 pages).
Patent Cooperation Treaty, "International Preliminary Report on Patentability," issued by the International Searching Authority in connection with PCT application No. PCT/IB2011/052886, mailed Jan. 22, 2013 (5 pages).
Patent Cooperation Treaty, "International Preliminary Report on Patentability," issued by the International Searching Authority in connection with PCT application No. PCT/IB2011/052888, mailed Jan. 22, 2013 (9 pages).
Patent Cooperation Treaty, "International Preliminary Report on Patentability," issued by the International Searching Authority in connection with PCT application No. PCT/IB2011/052891, mailed Jan. 22, 2013 (12 pages).
Patent Cooperation Treaty, "International Preliminary Report on Patentability," issued by the International Searching Authority in connection with PCT application No. PCT/IB2011/052893, mailed Jan. 22, 2013 (12 pages).
Canadian Intellectual Property Office, "Exam Report," issued in connection with Canadian Application No. 2,805,342, Nov. 13, 2013 (3 pages).
Canadian Intellectual Property Office, "Exam Report," issued in connection with Canadian Application No. 2,805,212, Nov. 13, 2013 (4 pages).
Taiwanese Patent Office, "Office Action," issued in connection with Taiwanese Patent Application No. 100123213, Jun. 25, 2014 (7 pages).
United States Patent and Trademark Office, "Supplemental Notice of Allowability," issued in connection with U.S. Appl. No. 12/841,875, Jun. 5, 2014 (2 pages).
United States Patent and Trademark Office, "Supplemental Notice of Allowability," issued in connection with U.S. Appl. No. 12/841,875, Jun. 20, 2014 (2 pages).
United States Patent and Trademark Office, "Supplemental Notice of Allowability," issued in connection with U.S. Appl. No. 12/841,875, Aug. 1, 2014 (2 pages).
Taiwan Intellectual Property Office, "Office Action," issued in connection with Taiwan Application No. 100123210, on Jan. 10, 2014 (10 pages).
Taiwan Intellectual Property Office, "Office Action," issued in connection with Taiwan Application No. 100123218, on Sep. 10, 2013 (14 pages).
Taiwan Intellectual Property Office, "Office Action," issued in connection with Taiwan Application No. 100123187, on Sep. 5, 2013 (9 pages).
United States Patent and Trademark Office, "Non-Final Office Action," issued in connection with U.S. Appl. No. 12/841,850, on Nov. 27, 2012 (10 pages).
United States Patent and Trademark Office, "Final Office Action," issued in connection with U.S. Appl. No. 12/841,850, on Apr. 11, 2013 (15 pages).
United States Patent and Trademark Office, "Advisory Action," issued in connection with U.S. Appl. No. 12/841,850, on Jun. 18, 2013 (3 pages).
United States Patent and Trademark Office, "Non-Final Office Action," issued in connection with U.S. Appl. No. 12/841,859, on Dec. 10, 2012 (10 pages).
United States Patent and Trademark Office, "Final Office Action," issued in connection with U.S. Appl. No. 12/841,859, on Aug. 23, 2013 (11 pages).
United States Patent and Trademark Office, "Non-Final Office Action," issued in connection with U.S. Appl. No. 12/841,863, on Jul. 5, 2012 (9 pages).
United States Patent and Trademark Office, "Final Office Action," issued in connection with U.S. Appl. No. 12/841,863, on Jan. 22, 2013 (10 pages).
United States Patent and Trademark Office, "Restriction Requirement," issued in connection with U.S. Appl. No. 12/841,873, on May 11, 2012 (6 pages).
United States Patent and Trademark Office, "Non-Final Office Action," issued in connection with U.S. Appl. No. 12/841,873, on Aug. 16, 2012 (11 pages).
United States Patent and Trademark Office, "Final Office Action," issued in connection with U.S. Appl. No. 12/841,873, on Dec. 5, 2012 (13 pages).
United States Patent and Trademark Office, "Advisory Action," issued in connection with U.S. Appl. No. 12/841,873, on Feb. 14, 2013 (2 pages).
United States Patent and Trademark Office, "Non-Final Office Action," issued in connection with U.S. Appl. No. 12/841,875, on Dec. 7, 2012 (7 pages).
United States Patent and Trademark Office, "Non-Final Office Action," issued in connection with U.S. Appl. No. 12/841,875, on Feb. 27, 2013 (16 pages).
United States Patent and Trademark Office, "Final Office Action," issued in connection with U.S. Appl. No. 12/841,875, on Oct. 3, 2013 (12 pages).
United States Patent and Trademark Office, "Notice of Allowance," issued in connection with U.S. Appl. No. 12/841,875, on Jan. 9, 2014 (9 pages).
Taiwan Intellectual Property Office, "Office Action," issued in connection with Taiwan Application No. 100123212 on Mar. 12, 2014 (8 pages).
Taiwan Intellectual Property Office, "Notice of Allowance," issued in connection with Taiwan Application No. 100123218 on Mar. 21, 2014 (3 pages).
United States Patent and Trademark Office, "Corrected Notice of Allowability" issued in connection with U.S. Appl. No. 12/841,873, on Apr. 2, 2014 (6 pages).
United States Patent and Trademark Office, "Office Action" issued in connection with U.S. Appl. No. 12/841,850, on Jan. 27, 2014 (22 pages).
United States Patent and Trademark Office, "Notice of Allowance" issued in connection with U.S. Appl. No. 12/841,873, on Jan. 17, 2014 (5 pages).
Taiwanese Intellectual Property Office, "Notice of Allowance," issued in connection with Taiwanese Application No. 100123210, on Apr. 30, 2014 (3 pages).
United States Patent and Trademark Office, "Notice of Allowance," issued in connection with U.S. Appl. No. 12/841,850, on May 9, 2014 (9 pages).
United States Patent and Trademark Office, "Notice of Allowance," issued in connection with U.S. Appl. No. 12/841,875 on Apr. 24, 2014, (9 pages).

\* cited by examiner

```
400
     <Partial Timeslot Assignment struct > ::=
502 {    {0 -- one-in-N assignment
         <BLOCK_PERIOD : bit(3) >
         {0|1 <START_BLOCK : BIT(3) > }
         | 1 -- bitmap assignment
602 {    < REPEAT_LENGTH : bit (2) >
         < ASSIGNMENT_BITMAP : bit (r(REPEAT_LENGTH))}
```
FIG. 4
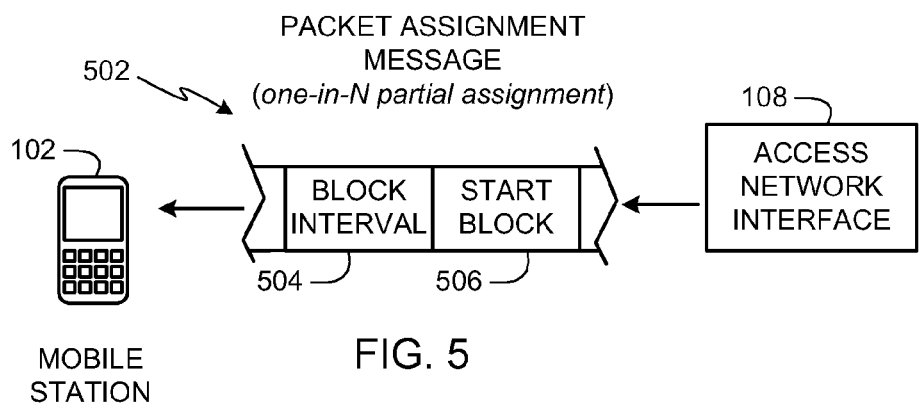
FIG. 5
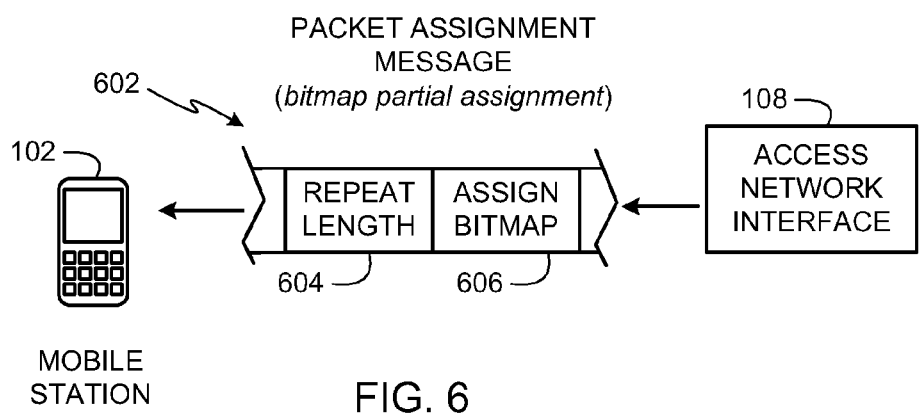
FIG. 6

1-IN-3 DOWNLINK RADIO BLOCK ASSIGNMENT WITH UPLINK STATE FLAG (USF) COMMUNICATION

MOBILE STATION

METHODS AND APPARATUS TO COMMUNICATE DATA BETWEEN A WIRELESS NETWORK AND A MOBILE STATION

FIELD OF THE DISCLOSURE

The present disclosure relates generally to network communications and, more particularly, to methods and apparatus to communicate data between a wireless network and a mobile station.

BACKGROUND

Mobile communication devices exchange information with mobile communication networks by signaling requests to connect with the mobile communication networks. Such is the case when placing telephone calls and/or transmitting data using mobile communication devices. In some wireless and mobile communication systems, a mobile communication device can establish a data transfer session with a network by signaling its communication capabilities to the network and requesting that the network allocate a data channel for use by the mobile communication device to transfer its data to the network. In response, the network may assign resources to the mobile communication device to perform the data transfer. In other instances, a network may initialize a downlink data transfer by assigning downlink resources for use by a destination mobile communication device and transmit data to the destination mobile communication device on the assigned downlink resources.

BRIEF DESCRIPTION OF THE DRAWINGS

FIG. 4 depicts an example partial timeslot assignment structure that may be used to indicate which radio block periods include assigned radio blocks (and hence may include allocated radio blocks) for use by mobile stations for uplink or downlink communications.

FIG. 5 depicts a portion of an example packet assignment message containing a one-in-N partial assignment format that may be used to indicate which radio block periods include assigned radio blocks (and hence may include allocated radio blocks) for use by mobile stations for uplink or downlink communications as shown in FIG. 3.

FIG. 6 depicts a portion of another example packet assignment message containing a bitmap assignment format that may be used to indicate which radio block periods include assigned radio blocks (and hence may include allocated radio blocks) for use by mobile stations for uplink or downlink communications as shown in FIG. 3.

DETAILED DESCRIPTION

Figure 1:
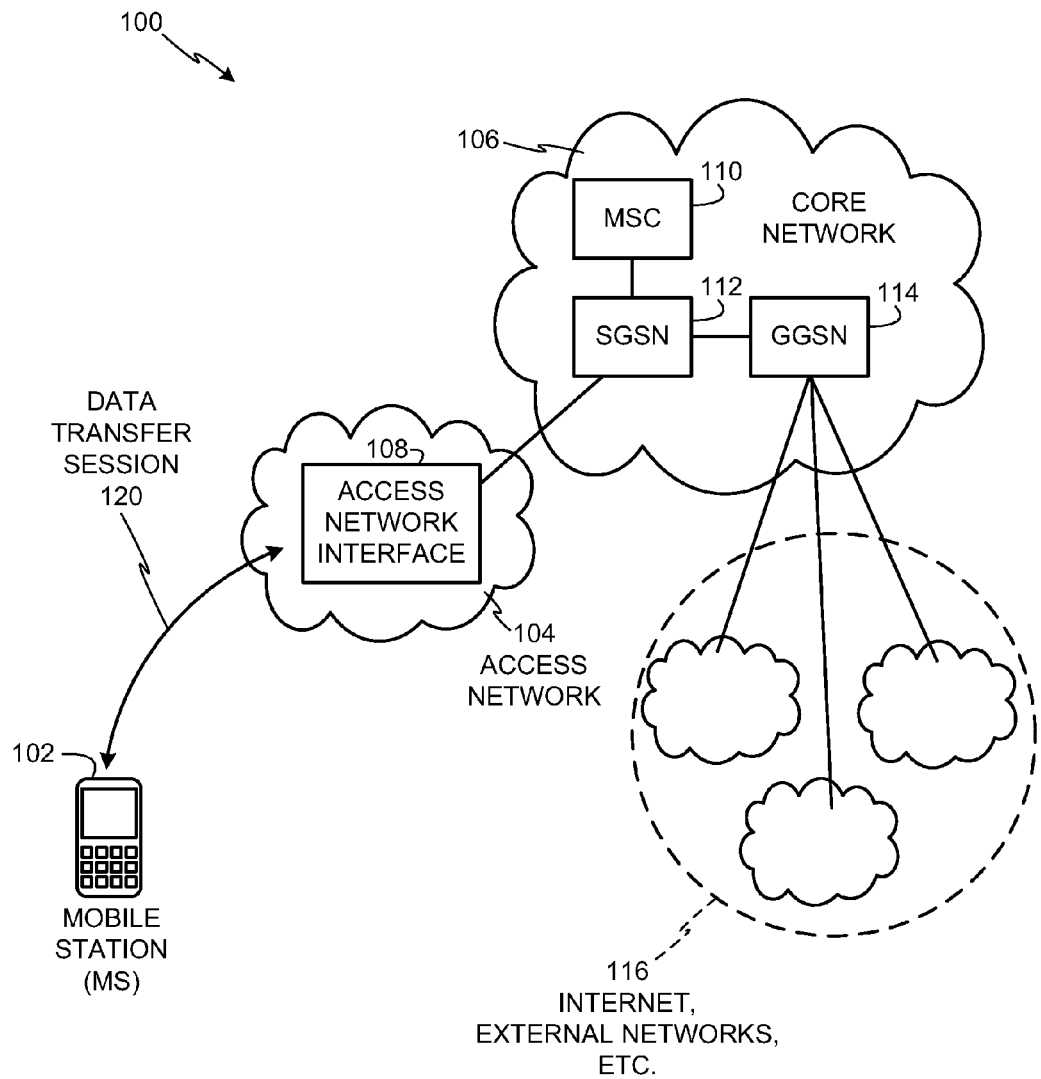
FIG. 1 depicts an example communications network in which the example methods and apparatus disclosed herein may be implemented.

Although the following discloses example methods and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

The example methods and apparatus described herein can be used in connection with mobile stations such as mobile communication devices, mobile computing devices, or any other mobile or non-mobile element, entity, device, or service capable of communicating wirelessly with a wireless network. Mobile stations, also referred to as terminals, wireless terminals, or user equipment (UE), may include mobile smart phones (e.g., a BlackBerry® smart phone), wireless personal digital assistants (PDA), laptop/notebook/netbook computers with wireless adapters, etc.

Example methods and apparatus described herein can be used to perform partial-timeslot packet assignments in wireless communications for data transfer sessions between mobile stations and access networks. Example methods and apparatus are described herein as being implemented in connection with General Packet Radio Service (GPRS) or Enhanced GPRS (EGPRS) networks, GSM (Global System for Mobile communications) networks, Enhanced Data Rates for GSM Evolution (EDGE) networks, and other mobile communication networks to implement data transfers between such networks and mobile stations. However, the example methods and apparatus may additionally or alternatively be implemented in connection with other types of wireless networks including other types of mobile communication networks to implement data transfers.

Example methods and apparatus are described herein in connection with particular signalling types or message types used by networks to make partial packet assignments. However, the example methods and apparatus may be implemented using any other signalling types and message types.

Example methods and apparatus disclosed herein can be used in connection with different types of data transfer sessions including, for example, small data transfer (SDT) sessions, machine-to-machine data transfer sessions, downlink data transfer sessions, uplink data transfer sessions, and/or any other type of data transfer sessions including any combination thereof. Data transfers enable communicating data between mobile stations and networks on an as-needed basis and can be triggered by different subsystems of a mobile station or a network upon the need to send information from the mobile station to the network or from the network to the mobile station. Information to be communicated may be generated by the mobile station (e.g., mobile station status information) or may be user-generated information (e.g., messaging, profile changes). Alternatively, the network may generate information or receive information from another mobile station or communication device (e.g., a computer, a landline telephone, a voicemail system, a paging system, etc.) intended for a destination mobile station. When a data transfer need arises, a mobile station may request a connection (e.g., one or more resources for uplink transmission) with a network or a network may initiate a connection with a mobile station.

To establish a data transfer session, a network may assign and/or allocate resources (e.g., data channels, timeslots, spreading codes, etc.) to a mobile station (MS) or to a temporary block flow (TBF) (e.g., a data transfer session) or to a connection or flow or flow context (e.g., a packet flow context) associated with a temporary flow identity (TFI) value (e.g., TFI values associated with a radio link control (RLC) entity when Enhanced Multiplexing for a Single TBF is used) in accordance with capabilities (e.g., radio access capabilities (RAC)) of the mobile station. To ensure that communications between different mobile stations and a network do not interfere with one another, the network performs scheduling and allocates different resources to different mobile stations. In this manner, the mobile stations can configure themselves to communicate with the network using their allocated resources so that they do not interfere with one another.

The methods and apparatus described herein may be used to implement partial packet assignments that allow a network (NW) to make partial (or fractional) downlink (DL) and/or uplink (UL) resource assignments (e.g., packet data channel (PDCH) assignments) available for allocating to mobile stations (MSs) for use in exchanging information with the network. An example resource is a PDCH, which is a logical channel assigned by a network for use in communications between mobile station(s) and the network. A PDCH has multiple resources in the form of radio blocks (e.g., single-channel radio blocks or PDCH radio blocks) as described in detail below in connection with FIG. 2. In the illustrated examples described herein, resources (e.g., radio blocks) assigned by a network are not necessarily allocated to a mobile station, but the network may allocate such assigned resources at some point to a mobile station for use in communicating with the network. Thus, an assignment specifies particular resources as available for subsequent allocation to a mobile station. A network may allocate the resources (e.g., radio blocks) of a PDCH to one or more mobile stations to enable exchanging downlink and/or uplink communications between the mobile station(s) and the network during data transfer sessions (e.g., TBFs). For example, each resource (e.g., radio block) on the PDCH can be separately allocated to a different mobile station so that multiple mobile stations can share the PDCH (without interfering with one another).

Example partial (or fractional) assignments described herein enable a network to assign resources (e.g., uplink and/or downlink radio blocks) on a PDCH at different intervals of occurring radio block instances (referred to herein as partial (or fractional) assignments) without assigning every single consecutive resource (or radio block instance) available for the PDCH. In this manner, unlike some prior art systems in which a network assigns every consecutive radio block instance on a PDCH as available for allocating to mobile stations for uplink/downlink communications and requiring such mobile stations to monitor every assigned radio block instance (or every radio block instance which may convey information regarding the allocation thereof), the partial assignment techniques described herein allow mobile stations to employ power-saving mechanisms by enabling mobile stations to not have to monitor one or more radio blocks that they would otherwise be required to monitor as a requirement of legacy-type assignments. For example, during some radio block periods, the mobile station may not need to monitor any radio blocks. Thus, the mobile station may reduce battery consumption associated with receiving and processing such radio blocks. For example, in some prior art systems in which a network assigns all consecutive radio blocks (e.g., radio blocks 0-3) on a PDCH as available for allocating for transmission to a mobile station, the mobile station must decode every downlink radio block (e.g., every downlink radio block 0-3) on the PDCH to determine whether it contains information pertaining to it (e.g., based on TFI values in radio block headers). Such monitoring may be used by the mobile station to determine whether any of the assigned downlink radio blocks (e.g., the assigned downlink radio blocks 0-3) has been allocated to the mobile station to convey downlink data intended for the mobile station. Similarly, the mobile station may be required to monitor radio blocks to determine whether downlink radio blocks contain information allocating to the mobile station a subsequent one or more of the assigned resources (e.g., subsequent uplink radio blocks). The partial assignments described herein enable a network to assign non-consecutive radio blocks such as, for example, radio blocks 0 and 2 (but not radio blocks 1 and 3) on a PDCH as available for allocating to a mobile station so that mobile station need only decode instances of downlink radio blocks 0 and 2, while using less power during intervening radio blocks 1 and 3.

The partial assignment techniques described herein also enable resource address re-use among different mobile stations by configuring a network to make different partial assignments of resources (e.g., radio blocks) of the same PDCH as available for allocating to different mobile stations. For example, unlike some prior art systems in which a network assigns all consecutive radio blocks (e.g., radio blocks 0-3) on a PDCH as available for allocating to a mobile station, the partial assignments described herein enable a network to assign a set of non-consecutive radio blocks (e.g., radio blocks 0 and 2) on a PDCH as available for allocating to a first mobile station and assign another set of non-consecutive radio blocks (e.g., radio blocks 1 and 3) on the same PDCH as available for allocating to a second mobile station. In this manner, the same address (corresponding to the same PDCH) is used to allocate resources on the same PDCH to different mobile stations. In some example implementations, a mobile station 102 ignores data or control blocks (or any non-broadcast information therein) that the mobile station 102 may receive or decode that are not received within a downlink partial assignment, independent of the value of any address (e.g., a TFI) in the received radio block. In some example implementations, a mobile station 102 ignores allocation indicators that the mobile station 102 may receive or decode that do not allocate a radio block within an uplink partial assignment, independent of the value of any uplink allocation indicator in the received radio block.

In some example implementations, before a network makes a partial assignment for a mobile station and/or allocates resources to a mobile station, the mobile station may communicate its capabilities to the network related to its compatibility with or ability to operate using particular types of assignments, partial assignments, and/or resource allocations. Additionally, the mobile station may communicate to the network its capabilities related to processing capabilities (or other, secondary capabilities) associated with quantities of data that the mobile station can transmit or receive and process within one or more radio block periods. In this manner, the network can determine the types of partial assignments and/or resource allocations described herein (or legacy types of assignments and/or allocations) that it can use for the mobile station. In addition, the network can determine how much data (e.g., quantities of radio blocks of data) that the network can send to the mobile station within one or more radio block periods without exceeding the data receiving and processing capabilities of the mobile station.

Turning now to FIG. 1, an example mobile communications network 100 is shown in communication with a mobile station 102. The mobile communications network 100 includes an access network 104 and a core network 106. The access network 104 includes an access network interface 108 in communication with the mobile station 102 to enable the mobile station 102 to exchange information with the core network 106. The access network interface 108 can be implemented using a processor-based device or a controller such as, for example, a packet control unit (PCU) for a GSM/EDGE (Enhanced Data rates for GSM Evolution) radio access network (GERAN), a radio network controller (RNC) for a UMTS radio access network (UMTS RAN), or any other type of controller for any other type of access network. Although not shown, the access network interface 108 may be implemented as at least two entities including a base transceiver station (BTS) (e.g., a BTS 2004 of FIG. 20) (connected directly to an antenna) and a base station controller (BSC) (e.g., a BSC 2002 of FIG. 20) (connected to the core network 106 and typically including the PCU functionality). In some example implementations, such as in accordance with 3GPP standards, the access network interface 108 is implemented as a combination of functionalities in an entity referred to as a base station subsystem (BSS).

The core network 106 can be a GPRS core network or a core network of any other communication technology type. In the illustrated example, the core network 106 includes a mobile switching center (MSC) server 110, a serving GPRS support node (SGSN) 112, and a gateway GPRS support node (GGSN) 114. As is known, the SGSN 112 manages subscriber-specific data during subscriber sessions and the GGSN 114 establishes and maintains connections between the core network 106 and external packet data networks 116 (e.g., the Internet, private networks, etc.).

In the illustrated example of FIG. 1, the mobile station 102 can register with the core network 106 upon discovering the access network 104 by performing a registration process using non-access stratum signaling. After registering with the core network 106, the mobile station 102 can subsequently, at one or more times while it is registered, request connections with the access network interface 108 to request the access network interface 108 to establish data transfer sessions between the mobile station 102 and the access network 104. For example, as shown in FIG. 1, the mobile station 102 establishes a data transfer session 120 with the access network 104. Similarly, the access network 104 may initiate the establishment of the data transfer session 120 with the mobile station 102 to, for example, transmit downlink data. The data transfer session 120 can be a small data transfer session, a machine-to-machine data transfer session, a downlink data transfer session, an uplink data transfer session, and/or any other type of data transfer session including any combination thereof. During a process to establish the data transfer session 120 or after the data transfer session 120 has been established, the access network 104 sends packet assignment messages to the mobile station 102 to assign downlink radio block and/or uplink radio block resources that are available for allocation to the mobile station 102 to receive or send data during the data transfer session 120. The example methods and apparatus described herein can be used to implement such packet assignment messages such that the access network 104 can make partial assignments of resources to the mobile station 102 to enable better communication efficiency and decrease power consumption of the mobile station 102 during the data transfer session 120.

Figure 2:
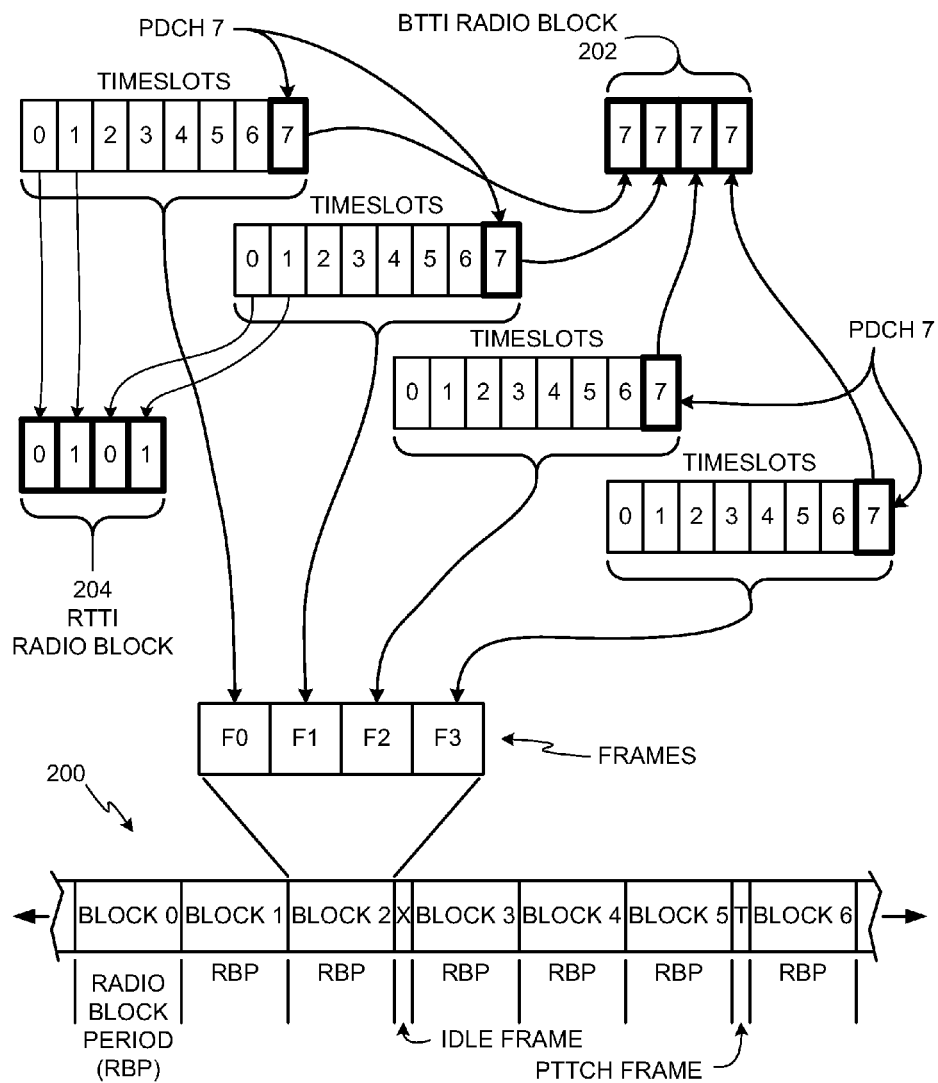
FIG. 2 is an example radio block sequence that may be used to implement downlink radio blocks communicated by a network to a mobile station or uplink radio blocks communicated by a mobile station to a network.

FIG. 2 is an example radio block period sequence 200 during which downlink and/or uplink radio blocks may be communicated between the access network 108 and the mobile station 102. In the illustrated example, seven radio blocks (BLOCK 0-BLOCK 6), an idle frame (X), and a packet timing advance control channel (PTCCH) frame (T) are shown in the block period sequence 200. In the illustrated examples described herein, each radio block of FIG. 2 noted as BLOCK 0-BLOCK 6 is referred to as a radio block period (RBP). The structure of RBP BLOCK 2 is shown in detail as comprising four frames (F0-F3), and the structure of each frame is shown in detail as having 8 timeslots each, as is known for GSM/GPRS communications.

In the illustrated example, each of the timeslots corresponds to a separate PDCH. For example, PDCH 7 is noted in FIG. 2 as comprising timeslot 7 of each frame (F0-F3). In the illustrated examples described herein, timeslots corresponding to the same PDCH (e.g., timeslots 7 of the PDCH 7) in a radio block period form a radio block for that PDCH. For example, as shown in FIG. 2, a radio block 202 comprises timeslot 7 from each of the frames (F0-F3). Thus, an RBP (e.g., any of BLOCK 0-BLOCK 6) comprises multiple radio blocks (e.g., 8 radio blocks, each corresponding to a respective one of timeslots 0-7), each on a respective PDCH (e.g., PDCH 0-PDCH 7).

In the illustrated examples described herein, a PDCH assignment comprises a set of timeslots (e.g., timeslots 7 of frames F0-F3 shown in FIG. 2) on one carrier or on two carriers. For an uplink assignment, the assignment contains the total set of PDCHs (i.e., timeslot number-carrier pairs) that may (subject to allocation) be used by a mobile station (e.g., the mobile station 102 of FIG. 1) for uplink transmissions. For a downlink assignment, the assignment contains the total set of PDCHs on which a network (e.g., the access network 104 of FIG. 1) may send data to the mobile station 102. In the example implementations described herein, an assignment message is a message that modifies, adds, or reduces the set of resources assigned to a mobile station. Examples of assignment messages in GSM/GPRS systems are PACKET TIMESLOT RECONFIGURE messages, PACKET UPLINK ASSIGNMENT messages, PACKET DOWNLINK ASSIGNMENT messages, HANDOVER COMMAND messages, etc.

Also in the illustrated examples described herein, for any given radio block period (e.g., any of the RBPs (BLOCK 0-BLOCK 6) of FIG. 2) (normally comprising four TDMA frames (e.g., frames F0-F3 of FIG. 2), and each frame comprising 8 timeslots (e.g., timeslots 0-7 of FIG. 2)), a network (e.g., the access network 104 of FIG. 1) dynamically allocates resources and determines on which downlink timeslots/uplink timeslots a mobile station shall receive/transmit data. For example, in FIG. 2, the access network 104 may allocate the radio block 202 resource of the assigned PDCH 7 to the mobile station 102. If the radio block 202 is an uplink resource, the mobile station 102 may use the radio block 202 to send data to the access network 104. If the radio block 202 is a downlink resource, the mobile station 102 may receive data from the access network 104 in the radio block 202. Algorithms employed by networks for allocating resources (e.g., the radio block 202) may be implementation dependent, but typically take into account the mobile stations' multislot classes (i.e., the maximum quantity of timeslots (Tx and/or Rx timeslots) on which a mobile station can transmit/receive and a "sum" quantity thereof, and the time required to switch between transmit and receive modes) and/or radio access capabilities (RAC) of mobile stations, and typically take account of the amount of data the network expects a mobile station to receive/transmit.

A destination mobile station, flow, packet flow context, or RLC entity (or other entity/connection) chosen by the network for a particular downlink radio block period may be indicated by a Temporary Flow Identity (TFI) (e.g., each uplink or downlink Temporary Block Flow (TBF) established for the destination mobile station is assigned a respective TFI in an assignment message). In addition, a network may allocate uplink radio blocks to a specific mobile station by using an Uplink State Flag (USF) as described in more detail below.

In the illustrated examples described herein, resource allocations (e.g., allocations of timeslot resources of assigned PDCHs) may be made using Basic Transmit Time Interval (BTTI) blocks or Reduced Transmit Time Interval (RTTI) blocks. A BTTI block consists of a timeslot number (e.g., timeslot 7 of FIG. 2) allocated over four consecutive frames (e.g., frames F0-F3 of FIG. 2). For example, the radio block 202 of FIG. 2 comprises frame F0, timeslot 7; frame F1, timeslot 7; frame F2, timeslot 7; and frame F3, timeslot 7 to form a BTTI block. In some example implementations, a frame (e.g., one of the frames F0-F3) is approximately 5 milliseconds (ms) in duration, such that a BTTI block (e.g., the radio block 202) spans over a 20-ms duration. A BTTI TBF is a TBF which uses BTTI blocks Unlike a BTTI block (e.g., the radio block 202) which is formed using a single timeslot from each of four frames, an RTTI block is formed using a pair of time slots from each of two frames. In example implementations that use RTTI blocks, a radio block period contains only two TDMA frames (e.g., F0 and F1) unlike the four TDMA frames (F0-F3) used to form RBP BLOCK 2 for example implementations that use BTTI blocks. As shown in FIG. 2, an RTTI radio block 204 is formed using a pair of timeslots (timeslot 0 and timeslot 1) of a first frame (F0) and a pair of timeslots (timeslot 0 and timeslot 1) of a next frame (F1). As such, the RTTI radio block 204 has four timeslots and spans over two frames (e.g., a reduced radio block period comprising frames F0 and F1) or a 10 ms duration. Thus, a BTTI block and an RTTI block can carry the same amount of data because they are both formed of four timeslots, but an RTTI block can convey the same amount of information in half the time required by a BTTI block. The example methods and apparatus described herein may be used to allocate BTTI blocks, RTTI blocks, and/or any combination thereof.

Figure 3:
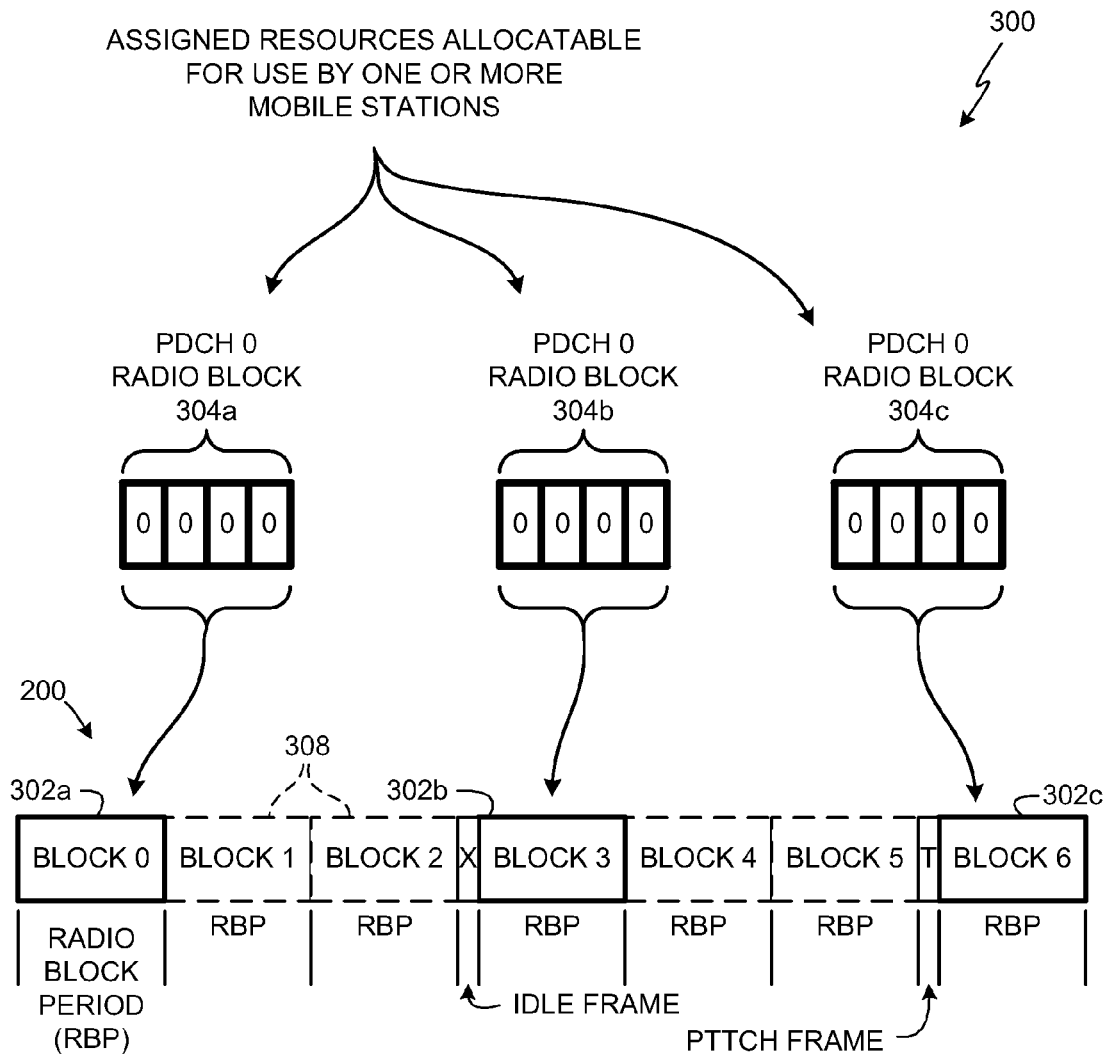
FIG. 3 is an example partial packet assignment arrangement in which radio blocks are assigned based on radio block periods for use by mobile stations for uplink or downlink radio block communications.

FIG. 3 is an example partial packet assignment arrangement 300 of the radio block period sequence 200 in which radio blocks are assigned based on intervals of radio block periods and allocatable for use by the mobile station 102 for uplink or downlink radio block communications (e.g., during the data transfer session 120 of FIG. 1). In the illustrated example of FIG. 3, instead of assigning (and, thus, allowing for possible allocation to) the mobile station 102 a resource (or a radio block) in every one of the radio block periods (BLOCK 0-BLOCK 6), the partial packet assignment arrangement 300 shows a one-in-N partial assignment, in which N is a quantity of radio block periods (e.g., a quantity of the RBPs BLOCK 0-BLOCK 6). In the illustrated example, the radio block period quantity (N) (e.g., a partial assignment interval) is set to three so that the network-assigned resources (that are allocatable to the mobile station) occur every third radio block period, noted as radio block periods 302a (BLOCK 0), 302b (BLOCK 3), and 302c (BLOCK 6). Thus, the quantity of non-assigned radio block periods occurring between the assigned radio block periods 302a (BLOCK 0), 302b (BLOCK 3), and 302c (BLOCK 6) is two (i.e., non-assigned radio block period(s)=(N−1)).

When implemented in downlink radio block periods, the radio block periods 302a, 302b, and 302c may be allocated for the mobile station 102 to receive data from the access network 104. In particular, FIG. 3 shows PDCH 0 radio blocks 304a-c, which are particular resources of the radio block periods 302a-c that are assigned by the access network 104 and may be allocated to one or more mobile stations (e.g., the mobile station 102 of FIG. 1) for use in communicating with the access network 104. In the illustrated example, the PDCH 0 radio blocks 304*a-c* correspond to a packet data channel 0, and each of the PDCH 0 radio blocks 304*a-c* is a radio block of the PDCH 0 in a respective one of the radio block periods 302*a-c* that are assigned to the mobile station 104. In the illustrated example, each of the radio blocks 304*a-c* is separated from a next occurring one of the radio blocks 304*a-c* by two non-assigned radio block periods (e.g., non-assigned radio block periods 308). For example, assigned radio block period 302*a* is separated from the next occurring assigned radio block period 302*b* by radio block periods BLOCK 1 and BLOCK 2 shown as the non-assigned radio block periods 308. Alternatively, the partial assignment technique of FIG. 3 may be implemented by assigning radio block periods to the mobile station 102 with only one intervening non-assigned radio block period (e.g., in a one-in-two partial assignment) or with more than two intervening non-assigned radio block periods.

Using the partial assignment of FIG. 3 to assign resources at radio block periods at N=3 radio block period intervals enables corresponding mobile stations to employ power-saving techniques during intervening radio block periods (e.g., BLOCK 1, BLOCK 2, BLOCK 4, and BLOCK 5) not having assigned resources allocatable to such mobile stations because the mobile stations need not monitor and decode radio blocks during those radio block periods.

FIG. 4 depicts an example partial timeslot assignment structure 400 that may be used to assign resources (e.g., the radio blocks 304*a-c* of FIG. 3) within radio block periods (e.g., one or more of the radio block periods (BLOCK 0-BLOCK 6) of FIG. 3) based on radio block periods for use by mobile stations for downlink and/or uplink radio block communications. In the illustrated example, the partial timeslot assignment structure 400 is described using CSN.1 (Concrete Syntax Notation 1). In the illustrated example, when the partial timeslot assignment structure 400 is used to make a partial assignment, it is configured to include either one-in-N assignment fields 502 or bitmap assignment fields 602. In use, one of the one-in-N assignment field 502 or the bitmap assignment field 602 may be selected for use in assigning radio block periods based on different radio block period intervals (e.g., radio block period quantities (N)) as described above in connection with FIG. 3. For example, when the first bit in the partial timeslot assignment structure 400 is set to zero (0), the access network 104 communicates a packet assignment message (e.g., a packet uplink assignment message, a packet downlink assignment message, a packet timeslot reconfigure message, a packet switched (PS) handover command message, etc.) having the one-in-N assignment fields 502 as shown in FIG. 5. Alternatively, when the first bit in the partial timeslot assignment structure 400 is set to one (1), the access network 104 communicates a packet assignment message having the bitmap assignment fields 602 as shown in FIG. 6.

Turning to FIG. 5, the one-in-N assignment fields 502 of a packet assignment message include a block interval field 504 and an optional start block field 506. In the illustrated example, the block interval field 504 is a 3-bit field that stores the value of the radio block period quantity (N) for a one-in-N assignment. In some example implementations, the start block field 506 can be dynamically enabled or disabled.

If the start block field 506 is enabled, the value in the start block field 506 represents a particular radio block period position of a radio block period sequence (e.g., the radio block period sequence 200 of FIGS. 2 and 3) at which a first one of the radio block periods 302*a-c* (FIG. 3) assigned using the one-in-N assignment is located. Otherwise, if the start block field 506 is disabled, the one-in-N radio block period assignment for a target mobile station begins with the radio block period in which the packet assignment message containing the one-in-N assignment fields 502 is completely received.

Alternatively, if the start block field 506 is disabled, the one-in-N radio block period assignment for a target mobile station may begin at some deterministic point in time. In some example implementations, a deterministic point in time may be the next radio block period meeting a requirement associated with a TDMA frame number of the first frame in a radio block period. For example, if the block interval field 504 specifies N=3 (three radio block periods), a repeat length of 13 TDMA frames (i.e., 3 (radio block periods)×4 (TDMA frames/radio block period), plus 1 idle/PTCCH frame) is required. Thus, the partial assignment starts in the next radio block period where FN mod 13=0, where FN is the TDMA frame number of the first frame in that radio block period.

Turning to FIG. 6, the bitmap assignment fields 602 of a packet assignment message include a repeat length field 604 and an assignment bitmap field 606. In the illustrated example, the repeat length field 604 is a 2-bit field that indicates the radio block length of a resource assignment bitmap and, thus, the length of the repeating pattern of assigned blocks. The assignment bitmap field 606 is an n-bit field, where (n) represents a quantity of bits equal to the radio block length indicated in the repeat length field 604. For example, if the repeat length field 604 represents 12 radio blocks (i.e., an assigned radio block pattern repeats every 12 radio blocks), the assignment bitmap field 606 includes n=12 bits. In such an example, each of the n=12 bits represents a respective one of 12 radio blocks, and each of the n=12 bits can be set to zero (0) or set to one (1). A zero (0) in one of the n=12 bits indicates that resources, such as timeslots or radio blocks, in a corresponding radio block period (BLOCK 0-BLOCK 7 of FIGS. 2 and 3) are not assigned (and, thus, may not be subsequently allocated to a target mobile station (e.g., the mobile station 102 of FIG. 1)), while a one (1) in one of the n=12 bits indicates that resources (e.g., the radio block 304*a* of FIG. 3) in a corresponding radio block period (e.g., the radio block period 302*a* (BLOCK 0)) are assigned (and, thus, may subsequently be allocated to the target mobile station). The pattern of assigned and not assigned resources noted in the n=12 assignment bitmap is then repeated every 12 radio blocks so that resources of the next radio block periods are assigned (and, thus, allocatable to the target mobile station) in the same relative positions in each repeating sequence of 12 radio blocks. In some example implementations, such as ones in which an assignment bitmap is used, partial assignments may comprise any pattern or sequence of assigned and non-assigned radio block periods (e.g., patterns or sequences of any combination of consecutive and/or non-consecutive assigned radio block periods). Partial assignments may, thus, be permitted in instances in which the majority of radio block periods are assigned or in instances in which the majority of radio block periods are not assigned. In some example implementations, the bitmap length may be shorter than the repeat length, in which cases the mobile station 102 interprets block periods for which no corresponding bit is present in the bitmap as not assigned (or, alternatively, assigned).

The partial timeslot assignment structure 400 may be used to assign uplink resources (e.g., a PDCH) or to assign downlink resources (e.g., a PDCH) for a mobile station. For example, to assign downlink resources in a GSM/GPRS network, the access network 104 may send the one-in-N assignment fields 502 or the bitmap assignment fields 602 to the mobile station 102 using a PACKET DOWNLINK ASSIGNMENT message on a Packet Associated Control Channel (PACCH) used to convey control or signaling information (e.g., acknowledgements and power control information, resource assignments, and/or resource requirements).

To assign uplink resources in a GSM/GPRS network, the access network 104 may send the one-in-N assignment fields 502 or the bitmap assignment fields 602 to the mobile station 102 using a PACKET UPLINK ASSIGNMENT message on a PACCH. In some example implementations (e.g., in two-phase access establishment scenarios), the access network 104 may send the PACKET UPLINK ASSIGNMENT to the mobile station 102 on the PACCH in response to receiving a PACKET RESOURCE REQUEST message from the mobile station 102. In other example implementations (e.g., in one-phase access establishment scenarios), the access network 104 may include the partial timeslot assignment structure 400 in an IMMEDIATE ASSIGNMENT message to the mobile station 102 on a Common Control Channel (CCCH) in response to receiving a CHANNEL REQUEST message or EGPRS PACKET CHANNEL REQUEST message from the mobile station 102. In known techniques, part of an assignment message may indicate which timeslots (i.e., PDCHs) are assigned for uplink or downlink transmission, and may indicate additional parameters such as an allocation mode, power control parameters, USF values, etc. Preferably, but not necessarily, partial assignments are indicated by the combination of such known indicators and a partial assignment structure (e.g., the partial assignment structure 400) within a single message, such that the parameters of known techniques may be considered "valid" (and in particular, addressing parameters such as TFIs, USFs, etc.) only during certain radio block periods. Existing assignment messages may assign resources indefinitely (e.g., until a TBF is released by conventional means and signaling) and a partial assignment is similarly valid while the TBF is assigned and not released. However, a partial assignment may also apply to a connection of predetermined duration or length (e.g., which may be expressed in terms of time or data quantity).

In some example implementations, the access network 104 may use a single instance of a partial assignment structure such as the partial timeslot assignment structure 400 to simultaneously indicate the radio block periods containing the assigned downlink and uplink resources for a mobile station. When implemented in connection with GSM/GPRS systems, the access network 104 may specify the assigned radio block periods associated with such simultaneous downlink and uplink assignments by communicating only one instance of either the one-in-N assignment fields 502 or the bitmap assignment fields 602 to the mobile station 102 in a PACKET TIMESLOT RECONFIGURE message on a PACCH. Alternatively or additionally, the access network 104 may omit some or all of a partial assignment structure (e.g., the partial timeslot assignment structure 400) from a subsequent assignment message when the newly assigned or modified resources are assigned in the radio block periods aligned with those associated with an existing TBF assignment. Such an alignment may not necessarily imply either co-incidence or a one-to-one correspondence (or both) between assigned uplink radio block periods and assigned downlink radio block periods. For example, when an uplink TBF is assigned where a downlink TBF is already assigned (or vice versa), the assigned resources may be aligned such that the radio block periods during which USFs would be sent to allocate assigned uplink resources are the same as the radio block periods during which downlink TBF resources may be allocated. In such a case, the access network 104 may include an indication (e.g., other than a complete partial assignment structure) such as, for example, a USF offset field 702 of FIG. 7, to distinguish the assignment from a non-partial assignment. The mobile station 102 may, thus, determine the partial nature (and the corresponding applicable radio block periods) of an assignment from an assignment message that does not contain a complete or explicit indication of the assigned radio block periods.

Alternatively or additionally, the access network 104 may include a partial assignment structure in a subsequent assignment message in the case that both the newly assigned or modified resources and resources associated with an ongoing TBF are assigned in the radio block periods indicated by the partial assignment structure. Such alignment may not necessarily imply either co-incidence or a one-to-one correspondence (or both) between assigned uplink radio block periods and assigned downlink radio block periods. In such example implementations, the access network 104 may include an indication in addition to or as part of a partial assignment structure to indicate that the partial assignment structure is to be used to determine the partial assignment of an ongoing TBF as well as of a new (or explicitly modified) TBF. The mobile station 102 may, thus, determine the (new or modified) partial nature (and the corresponding applicable radio block periods) of an existing TBF from an assignment message which does not contain a complete assignment for the TBF. For example, a mobile station having an ongoing uplink TBF may receive a PACKET DOWNLINK ASSIGNMENT message specifying a downlink TBF and indicating a partial assignment, and the mobile station may infer from this information that the ongoing uplink TBF is also now a partial assignment. The mobile station may determine the assigned radio blocks corresponding to the uplink TBF based on the partial assignment indication in the PACKET DOWNLINK ASSIGNMENT message.

In some example implementations, the access network 104 may be configured to use the partial timeslot assignment structure 400 to implicitly indicate assigned uplink resources based on explicit downlink resource assignments or vice versa. For example, the access network 104 may communicate the one-in-N assignment fields 502 or the bitmap assignment fields 602 to the mobile station 102 using a PACKET DOWNLINK ASSIGNMENT message on a PACCH. In turn, the mobile station 102 may decode the explicit downlink resource assignment and be configured to interpret a subsequent uplink resource assignment as also implicitly being a partial assignment, aligned with the ongoing, downlink assignment. For example, if an explicit downlink resource assignment includes radio block periods 0, 4, 8, etc., the mobile station 102 may interpret a subsequent uplink resource assignment (which may, for example, include a USF offset indicator equal to three (3)) as including radio block periods 3, 7, 11, etc. In such an example, the implied uplink radio block period assignments are offset by a radio block period interval of three (3) from the explicit downlink radio block period assignments. In example implementations in which a USF offset indicator (e.g., in a USF offset field 702 of FIG. 7) is not used, a detected USF value is handled using legacy rules (e.g., the allocated uplink radio block occurs during the radio block period occurring immediately after the radio block period containing the USF value), and the partial uplink assignment is, thus, correspondingly determined. Thus, in example implementations in which assigned radio blocks are indicated implicitly (e.g., based on a previous partial assignment), the relationship between uplink radio block periods and downlink radio block periods is correspondingly determined, such that radio block periods in which USFs are sent to allocate assigned resources are the same as those in which downlink radio blocks may be allocated.

Figure 7:
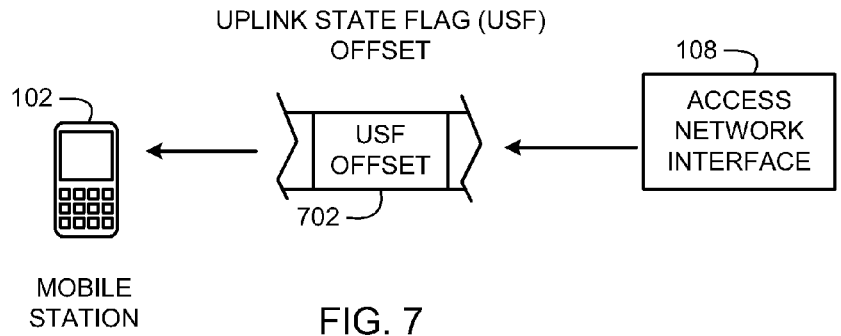
FIG. 7 depicts a portion of another example packet assignment message containing an uplink state flag (USF) offset that may be used to indicate how subsequent uplink radio blocks are to be allocated for use by a mobile station.

FIG. 7 depicts an uplink state flag (USF) offset field 702 that can be communicated in a packet assignment message from the access network interface 108 to the mobile station 102. In the illustrated example, the USF offset field 702 is used by the access network 104 to indicate that allocated uplink radio block periods are offset from downlink radio block periods containing USF values by a quantity of radio block periods equal to a value in (or otherwise indicated by) the USF offset field 702. For example, if the USF offset field 702 indicates a value of two (2), the mobile station 102 is allocated an uplink radio block period within a block period that is offset by two radio blocks from a downlink radio block containing a USF value corresponding to the mobile station 102 as shown in FIG. 8.

Figure 8:
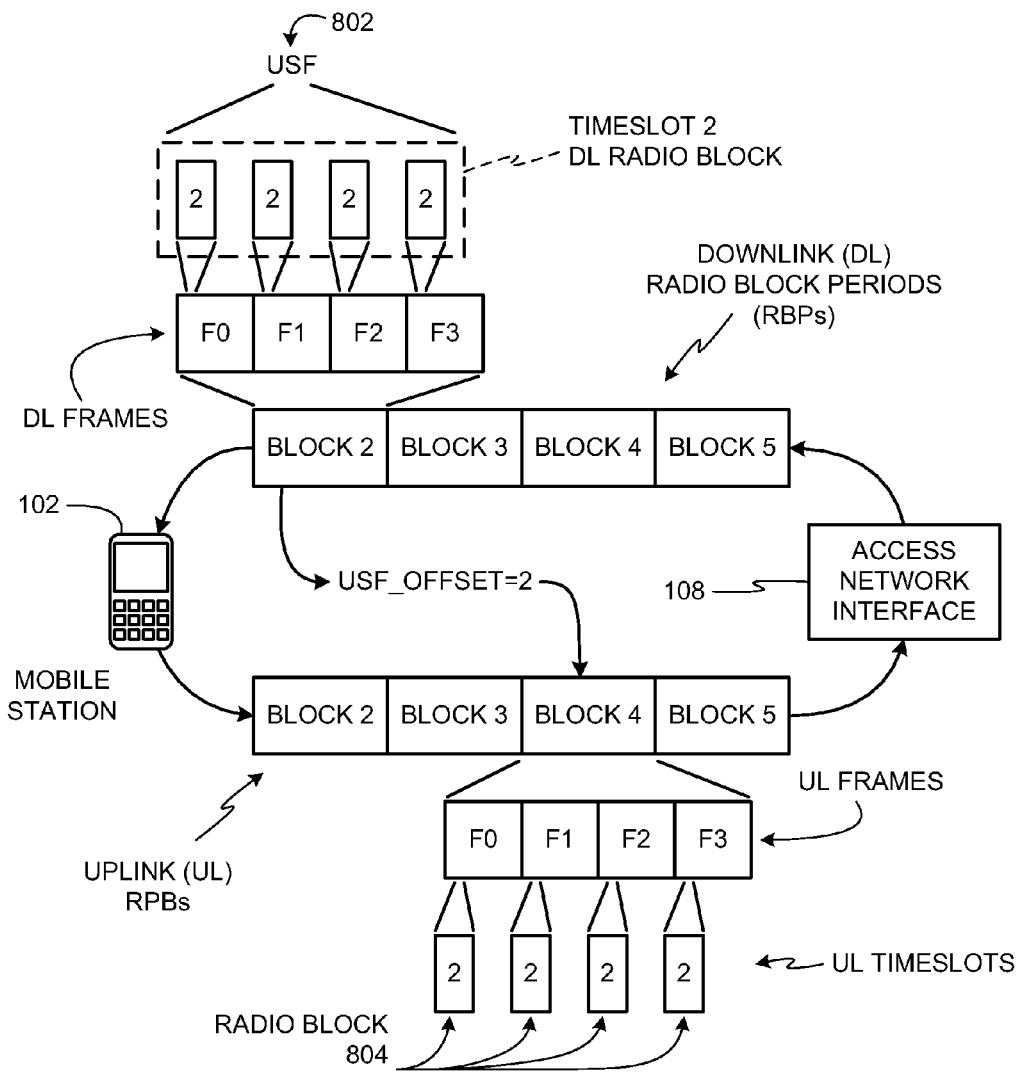
FIG. 8 depicts an example uplink and downlink radio block transaction between an access network interface and a mobile station in connection with the USF offset of FIG. 7.

Turning to FIG. 8, an example uplink and downlink radio block transaction is shown between the access network interface 108 and the mobile station 102 based on a USF offset value corresponding to the mobile station 102 in the USF offset field 702 of FIG. 7. The access network interface 108 may communicate uplink allocation indicators (e.g., USFs) in the headers of downlink radio blocks. In the illustrated example of FIG. 8, after the access network interface 108 communicates the USF offset field 702 to the mobile station 102 with a USF offset value of two (2), the mobile station 102 monitors downlink radio blocks for a USF value corresponding to (e.g., identifying, associated with, or assigned to a TBF assigned to) the mobile station 102. In the illustrated example, the mobile station 102 detects a USF value 802 in the header of the radio block transmitted in timeslot 2 of each of frames F0-F3 (i.e., during radio block period BLOCK 2). In turn, based on the detected USF value and the USF offset value in the USF offset field 702 (FIG. 7), the mobile station 102 is allocated uplink radio block 804 (i.e., an uplink resource) during the radio block period occurring two radio block periods after a previous uplink radio block period on the timeslot with the same number as (or, in other words, the corresponding timeslot to) the timeslot containing the USF value 802. As shown, the USF offset value of 2 in the USF offset field 702 indicates that receiving the USF value 802 in the downlink radio block period BLOCK 2 does not allocate any uplink radio block in the subsequent uplink radio block period BLOCK 3, but instead allocates an uplink radio block in the radio block period BLOCK 4.

The illustrated example of FIG. 8 depicts the USF value 802 in a BTTI radio block configuration, in which the USF value 802 appears in a radio block transmitted during the four frames (F0-F3). Alternatively, a USF transmitted in BTTI configuration may allocate an uplink RTTI radio block (e.g., using "BTTI USF mode" as defined in 3GPP TS 44.060). The resource allocation technique of FIG. 8 may be implemented with the allocated block offset by either a quantity of BTTI radio block periods or a number of RTTI radio block periods. Alternatively, the resource allocation technique of FIG. 8 may be implemented using an RTTI radio block configuration using an RTTI USF mode, in which the access network interface 108 locates the USF value 802 in a downlink radio block transmitted using two timeslots (e.g., timeslots 0 and 1 as shown in FIG. 2) of a first frame (F0) and the other two of the USF values 802 in respective timeslots (e.g., timeslots 0 and 1) of a next frame (F1). In this manner, the access network 104 may allocate an RTTI radio block (e.g., the RTTI radio block 204 of FIG. 2) to the mobile station 104. This approach may be employed independent of the correspondence (or mapping) between the timeslot number(s) on which an assigned USF is transmitted or detected and the timeslot number(s) of the resulting allocated uplink radio blocks. Known methods that could be combined with this approach include dynamic allocation (e.g., a USF in one radio block indicates an allocation of one or more uplink radio blocks). In addition, this approach may be used when the uplink resources allocated by a USF span multiple radio block periods (e.g., as may be indicated by a known USF GRANULARITY parameter). For example, a quantity of RLC/MAC (Radio Link Control/Medium Access Control) blocks to transmit on each allocated uplink PDCH/PDCH-pair may be controlled using a USF GRANULARITY parameter characterizing an uplink TBF. As is known, if USF GRANULARITY is set to four blocks allocation, the mobile station 102 may ignore the USF on all other PDCHs/PDCH-pairs during the first three block periods in which the mobile station has been granted permission to transmit. As is also known, the USF corresponding to the last three blocks of a four radio block allocation may be set to an unused value for each PDCH/PDCH-pair on which a mobile station has been granted permission to transmit.

The resource allocation technique of FIGS. 7 and 8 may be used in connection with the one-in-N partial assignment or the bitmap partial assignment techniques described above in connection with FIGS. 4-6. For example, the access network 104 may send a partial assignment using one of the one-in-N partial assignment technique or the bitmap partial assignment technique and the USF offset field 702 to the mobile station 102. Subsequently, the access network 104 may communicate the USF value 802 to the mobile station 102 to allocate uplink radio blocks. For example, a DL PACCH for conveying the USF offset field 702 may be constrained to DL timeslots that are to be monitored in accordance with an assigned UL and/or DL TBF (e.g., a UL and/or DL TBF assigned using a partial assignment). The USF value 802 may be constrained to the same radio block periods assigned by the partial assignment for use in DL data transmissions. In this manner, the mobile station 102 may receive the USF values 802 even if it is only decoding the radio blocks transmitted during radio block periods assigned to it based on a partial downlink assignment.

Figure 9:
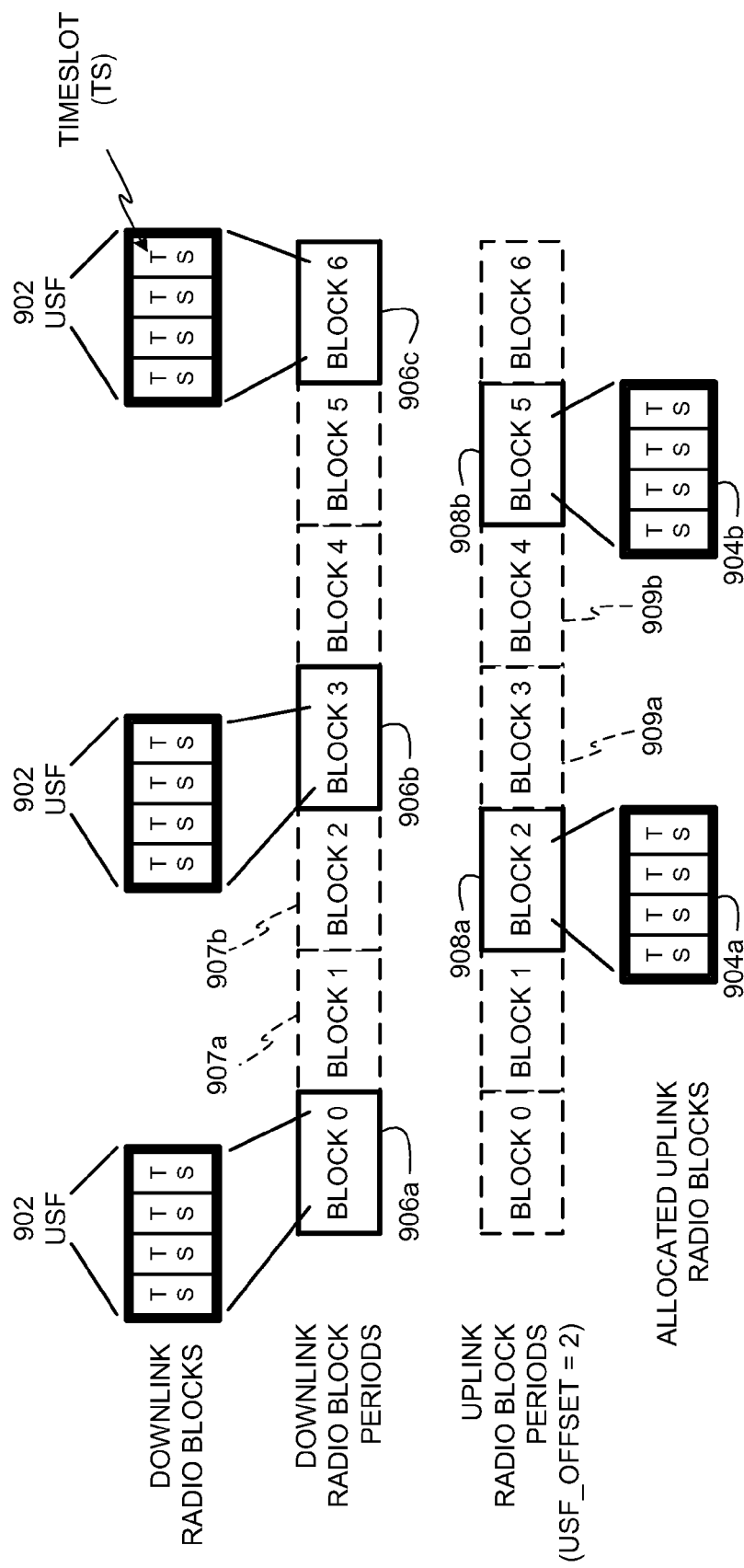
FIG. 9 depicts an example downlink radio block sequence in which USF transmissions to a mobile station are aligned with downlink radio block periods assigned to the same mobile station for receiving data from a network.

FIG. 9 depicts an example downlink radio block sequence in which USF transmissions 902 allocating resources to the mobile station 102 are aligned with downlink radio block periods 906*a-c* assigned to the same mobile station 102 for receiving data from the access network 104 (i.e., the USF transmissions 902 are transmitted in radio block periods during which the mobile station 102 is required to monitor downlink radio blocks based on its downlink assignment). In the illustrated example of FIG. 9, the downlink radio block periods 906*a-c* may be assigned to the mobile station 102 based on either of the one-in-N partial assignment technique or the bitmap partial assignment technique described above in connection with FIGS. 4-6. As shown, the assigned downlink radio block period 906*a* is separated from the next occurring assigned downlink radio block period 906*b* by non-assigned downlink radio block periods 907*a-b*.

In the illustrated example, the USF transmissions 902 indicate uplink resources 904*a-b* allocated to the mobile station 102. Configuring the access network 104 to send USFs allocating resources to the mobile station 102 in the same downlink radio block periods 906*a-c* in which the mobile station 102 can expect to receive data (and communicating information indicating such a configuration to the mobile station 102) improves communications efficiency by allowing the mobile station 102 to enter into a low-power mode during intervening radio blocks by not having to decode every downlink radio block for the presence of a corresponding USF value. That is, the mobile station 102 may decode radio blocks (e.g., the radio blocks 304*a-c* of FIG. 3 or any other radio blocks of assigned radio block periods) of only those downlink radio block periods (e.g., the radio block periods 906*a-c*) assigned to it for receiving downlink data and determine whether those downlink radio block periods contain USF values intended for the mobile station 102. Because USF values corresponding to the mobile station 102 are not transmitted by the access network 104 in downlink radio block periods other than the downlink radio block periods 906*a-c*, the mobile station 102 will not miss any USF values intended for it if it only decodes the downlink radio block periods 906*a-c* and ignores all other radio block periods.

The illustrated example of FIG. 9 also depicts an uplink radio block period assignment (radio block periods 908*a-b*) for the mobile station 102 based on a USF offset value of two as described above in connection with the USF offset field 702 of FIG. 7. In the illustrated example of FIG. 9, it is preferable, but not necessary, that an uplink radio block period (e.g., the uplink radio block period 908*a* or the uplink radio block period 908*b*) having an uplink resource (e.g., an uplink radio block 904*a* or an uplink radio block 904*b*) allocated to the mobile station 102 occurs at least at an offset of two relative to an allocated downlink radio block period (e.g., the downlink radio block period 906*a* or the downlink radio block period 906*b*) so that the mobile station 102 has at least a one radio block period delay for processing data or other information (e.g., ACK/NACK information sent by the access network 104 related to previous data sent by the mobile station 102 to the access network 104). Thus, it is preferable, but not necessary, that the assigned radio block periods are correspondingly aligned. In the illustrated example of FIG. 9, the assigned uplink radio block period 908*a* is separated from the next occurring assigned uplink radio block period 908*b* by non-assigned radio block periods 909*a-b*. Also in the illustrated example of FIG. 9, uplink radio block periods 908*a-b* occur two radio block periods after respective previous downlink radio block periods 906*a-b*.

In some instances, when a mobile station cannot confirm whether an access network successfully received data (e.g., based on ACK/NACK information) previously communicated by the mobile station, the mobile station re-transmits the data in an attempt to ensure that the access network successfully receives it. Because of the at least one radio block period delay as shown in FIG. 9, the mobile station 102 of FIG. 1 can decode and process any data or information (including ACK/NACK information at any protocol layer which may, for example, confirm whether data previously transmitted by the mobile station 102 was successfully received by the access network 104) in the most recently received downlink radio block and, thus, can generate appropriate data in response and/or select more appropriate data to transmit in the next-occurring uplink resource(s). In this manner, the mobile station 102 need only re-transmit data for which it could not confirm successful receipt based on ACK information and may prioritize retransmission of data for which it has received a negative acknowledgment or other indication that it has not been received by the network. In systems that do not provide such a delay between allocated downlink radio blocks and uplink radio blocks, mobile stations may not have sufficient time to process most recently received ACK/NACK information to avoid unnecessarily transmitting data that such ACK/NACK information confirms as being successfully received by an access network. In addition, allowing a delay of one or more radio block periods as shown in FIG. 9 may improve the timeliness and appropriateness of transmissions (including ACK/NACK information transmitted in response to downlink data transmitted by the network) sent by the mobile station 102.

Figures 21, 22:
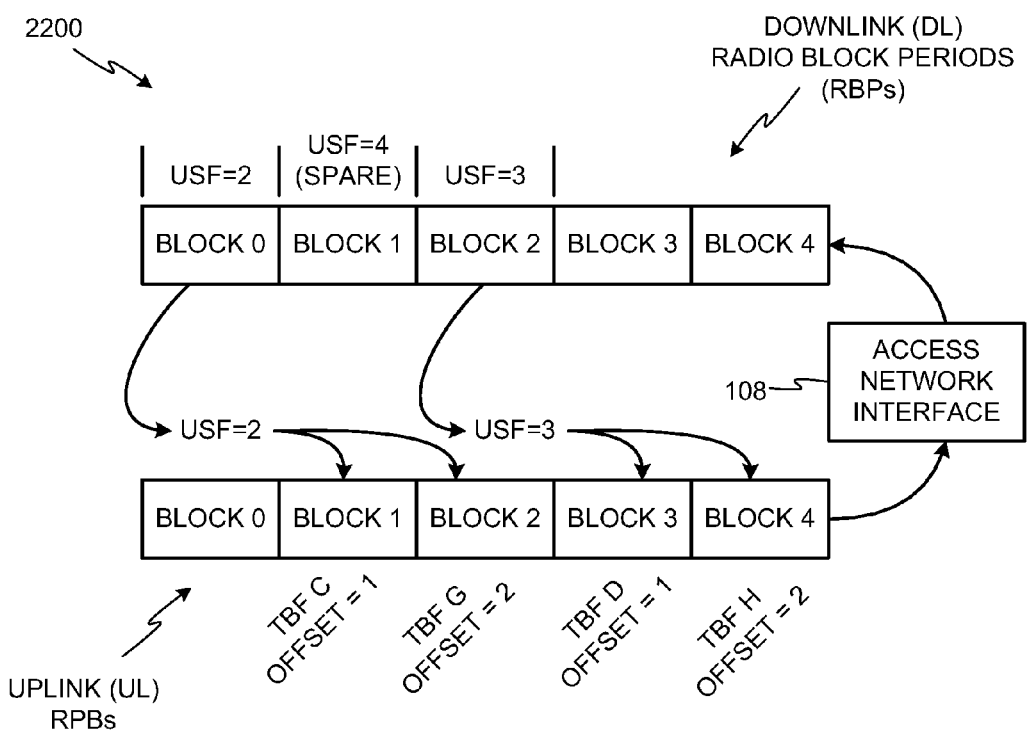
FIG. 21 depicts an example temporary block flow (TBF) offset table showing assignments of uplink state flag (USF) values and different USF offsets to multiple TBFs.
FIG. 22 depicts an example allocation of uplink radio blocks between an access network interface and one or more mobile stations in connection with the USF offset values of FIG. 21.

FIG. 21 depicts an example temporary block flow (TBF) offset table 2100 showing uplink state flag (USF) values 2102 and different USF offsets (e.g., offset=1 and offset=2) assigned to multiple TBFs (e.g., TBFs A, B, C, D, E, F, G, H). In some example implementations, two or more of the TBFs A, B, C, D, E, F, G, H may be the same TBF. For example, TBFs sharing the same value but with two different offsets may be the same TBF such that the reception of a single assigned USF value indicates an allocation in multiple radio block periods. The TBF offset table 2100 shows how the use of different USF offset values may be used to assign the same USF value on the same PDCH or timeslot to multiple TBFs to allow more users (e.g., more mobile stations) to share a single uplink timeslot. For example, as shown in FIG. 21, five distinct USF values (more distinct values (e.g., 7 or 8) may be used in other example implementations) are assigned to eight TBFs (e.g., TBFs A-H) for the same timeslot. In particular, USF value 0 is assigned to TBF A to indicate that TBF A is allocated a radio block offset by one (1) from a radio block period in which the USF value 0 was transmitted by an access network (e.g., the access network 104 of FIG. 1). In addition, USF value 0 is also assigned to a TBF E to indicate that TBF E is allocated a radio block offset by two (2) from a radio block period in which the USF value 0 was transmitted by an access network (e.g., the access network 104 of FIG. 1). Similarly, USF values 1-4 may be assigned to other TBFs to indicate similar types of resource allocations. In this manner, USF values may be re-used to indicate different resource allocations to different TBFs or mobile stations. For example, in the illustrated example of FIG. 21, each TBF A-H may be assigned to a respective mobile station, and each mobile station may respond accordingly when it detects its assigned USF value. Although FIG. 21 shows only USF offset values of one (1) and two (2), higher offset values may be used in other example implementations. Higher offset values may be advantageously used to increase the quantity of TBFs or mobile stations that can be multiplexed for each USF value. Preferably, but not necessarily, at least one value/USF-offset combination is reserved (e.g., is not assigned to any mobile station or TBF) to allow the access network 104 to avoid scheduling two different mobile stations/TBFs in the same timeslot (as shown in FIG. 22).

FIG. 22 depicts an example uplink and downlink radio block transaction 2200 between the access network interface 108 of FIG. 1 and one or more mobile stations (not shown) in connection with the USF offset values of FIG. 21. As shown in FIG. 22, when a mobile station associated with TBF C receives USF value=2 in radio block period (RBP) BLOCK 0, the mobile station is allocated a radio block RBP BLOCK 1 based on USF value=2 and offset=1 for TBF C as shown in the TBF offset table 2100 of FIG. 21. However, when the USF value=2 is received in radio block period (RBP) BLOCK 0 by a mobile station associated with TBF G, the mobile station is allocated a radio block in RBP BLOCK 2 based on USF value=2 and offset=2 for TBF G as shown in the TBF offset table 2100. Similarly, a mobile station associated with TBF D that receives USF=3 in RBP BLOCK 2 is allocated a radio block in RBP BLOCK 3 based on an offset=1 in the TBF offset table 2100, while a mobile station associated with TBF H that receives USF=3 in RBP BLOCK 2 is allocated a radio block in RBP BLOCK 4 based on an offset=2 in the TBF offset table 2100. Thus, a single USF value may be used to indicate allocated resources in two different RBPs for a single TBF or two different TBFs (e.g., TBFs assigned to two different mobile stations).

Figure 10:
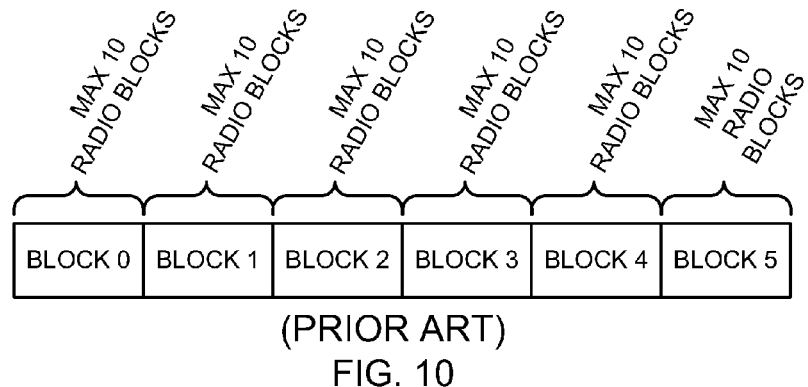
FIG. 10 depicts a known technique of specifying maximum radio block transmissions and/or receptions per radio block period, limiting the quantity of radio blocks that can be received/transmitted per radio block period by a network for a mobile station.

FIG. 10 depicts a known technique of specifying maximum radio block transmissions and/or receptions per radio block period, and thus, the maximum quantity of radio blocks that can be transmitted and/or received per radio block period for the mobile station 102. As shown in FIG. 10, known techniques allow a maximum quantity of radio blocks (e.g., 10 radio blocks) to be received by mobile stations per radio block period (e.g., based on a maximum number of timeslots on which a mobile station can receive data per TDMA frame). The maximum quantity of allowable radio blocks may be based on the processing capabilities (e.g., a processing capabilities limitation) of the mobile station. For example, a slower processing mobile station will have a smaller quantity of maximum quantity of allowable radio blocks per radio block period, while a faster processing mobile station will have a larger quantity of maximum allowable radio blocks because the faster processing mobile station can process more received data than the slower processing mobile station before a next occurring radio block. Some mobile communications standards define a maximum quantity of allowable radio blocks based on an Rx_Sum parameter (e.g., an example Rx_Sum parameter is defined in 3GPP TS 45.002 v. 9.3.0 for a maximum quantity of allowable radio blocks a single radio block period).

Mobile stations may additionally or alternatively be subject to secondary capabilities limitations associated with other aspects of the mobile stations. For example, such secondary capabilities limitations may include minimum switching times (i.e., minimum times required to switch between transmit and receive modes with or without performing neighbor cell measurements). Some example industry mobile communication standards define minimum switching times as parameters Tra, Trb, Tta, and Ttb, which may be characterized by a multislot class included in a mobile station's radio access capabilities. Some secondary considerations may include a maximum quantity of transmit timeslots (a Tx value) per TDMA frame, a maximum quantity of receive timeslots (an Rx value) per TDMA frame, and/or a maximum sum of transmit and receive timeslots per TDMA frame. Some example industry mobile communication standards define such a maximum quantity of transmit timeslots (a Tx value), a maximum quantity of receive timeslots (an Rx value), and/or maximum sums of transmit and receive timeslots per TDMA frame, which may all be characterized by a multislot class. These secondary capabilities limitations may permit a higher quantity of radio blocks to be used for transmission and/or reception within a particular radio block period than is possible according to the processing capabilities of a mobile station. Some example industry mobile communication standards (e.g., 3GPP TS 45.002 and 3GPP TS24.008, in which is described a Multislot Capability Reduction for Downlink Dual Carrier field) define quantities of radio blocks to be used for transmission and/or reception within a particular radio block period based on a difference between the maximum quantity of downlink timeslots possible due to secondary capabilities/restraints and the maximum quantity of downlink timeslots possible due to processing, or other similar, capabilities restrictions. A device (in particular, one capable of receiving on multiple carriers simultaneously (e.g., a device that supports a downlink dual carrier feature)) may be constrained by its processing capabilities that limit the quantity of radio blocks of data that it can process per radio block period, such that secondary capabilities limitations (e.g., based on switching times) are not the dominant limiting factor.

Figure 11:
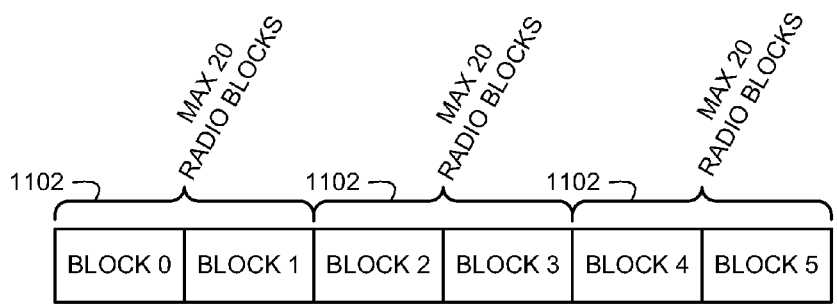
FIG. 11 depicts an example technique for specifying a maximum allowable cumulative quantity of resources for multiple downlink radio block periods.

FIG. 11 depicts an example technique in accordance with the example methods and apparatus described herein for specifying a maximum allowable cumulative quantity of radio blocks over a multiple downlink radio block period interval (e.g., a multiple downlink radio block period interval 1102). In the illustrated example, instead of specifying a maximum allowable quantity of radio blocks for a single radio block period as shown in the known technique of FIG. 10, the example technique of FIG. 11 may be used to characterize the processing capabilities of a mobile station over a multiple downlink radio block period interval 1102 (e.g., a group of two or more consecutive radio block periods) to specify a maximum allowable cumulative quantity of radio blocks that can be processed by a mobile station within the time corresponding to the multiple downlink radio block period interval 1102. In the illustrated example of FIG. 11, the mobile station 102 can receive and process a maximum allowable cumulative quantity of 20 radio blocks over two downlink radio block periods that make up a multiple downlink radio block period interval 1102. That is, during the occurrence of a multiple downlink radio block period interval 1102, the mobile station 102 can receive up to 20 radio blocks of data such that the 20 radio blocks of data could all occur in a first radio block period forming a multiple downlink radio block period interval 1102 (or, preferably, but not necessarily, a quantity of radio blocks of data, as limited by secondary capabilities limitations (e.g., based on switching times, Rx values, Tx values, etc.)), a second radio block period forming the same multiple downlink radio block period interval 1102 (or, preferably, but not necessarily, a quantity of radio blocks of data, as limited by secondary capabilities limitations (e.g., based on switching times)) or partially in the first block period and partially in the second block period. In any case, the example technique depicted in FIG. 11 allows the access network 104 to communicate information to the mobile station 102 in a flexible manner over two radio block periods, and the mobile station 102 has sufficient processing power to decode and process the 20 radio blocks of received data during the two radio block periods.

In some example implementations, the maximum quantity of allowable radio blocks per radio block period may be indicated by, for example, an indication in the RAC of the mobile station 102 that the maximum cumulative quantity of resources that the mobile station 102 is capable of receiving over a multiple downlink radio block period interval 1102 is specified by a receive sum (Rx_Sum) parameter (e.g., an Rx_Sum parameter defined in 3GPP TS 45.002 v. 9.3.0 which, in known systems, corresponds to a single radio block period) multiplied by a quantity of radio block periods in the multiple downlink radio block period interval 1102. In some example implementations, a maximum allowable cumulative quantity of radio blocks may be based on a sliding window over two or more radio block periods. For example, the maximum allowable cumulative quantity of radio blocks could be applied to all/any consecutive number of radio block periods such that radio block periods [n+1, n+2] are subject to a maximum radio block restriction and radio block periods [n+2, n+3] (i.e., n+2 is an overlapping radio block period) are also subject to the same maximum radio block restriction.

Figure 12:
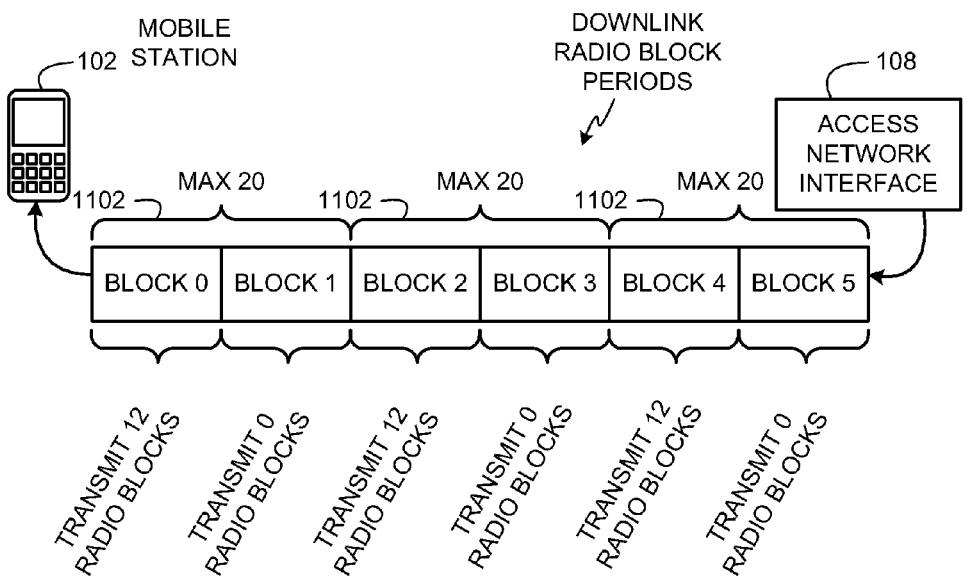
FIG. 12 depicts an example use of the technique of FIG. 11 to send downlink data to a mobile station based on a specified maximum cumulative quantity of resources allowable over multiple downlink radio block periods.

Turning to FIG. 12, the access network interface 108 can use the maximum allowable cumulative quantity of 20 radio blocks shown in FIG. 11 to send downlink data to the mobile station 102 as shown. For example, the access network interface 108 can transmit 12 radio blocks of data at a first radio block period forming a multiple downlink radio block period interval 1102 and zero radio blocks of data in a second radio block period forming the same multiple downlink radio block period interval 1102. Such a transmission technique can be advantageously used to provide the mobile station 102 with idle time to enter low power modes, and/or to receive and process a given amount of data while consuming relatively less power. For example, in the transmission scenario of FIG. 12, the mobile station 102 may enter into a low power mode during BLOCK 1, BLOCK 3, and BLOCK 5. Such low power opportunities would not be available using the known maximum allocated radio block configuration of FIG. 10 when needing to transmit more than 10 radio blocks of data, because the access network interface 108 could only transfer a maximum of 10 radio blocks of data in any one radio block period so that 12 total radio blocks of data would need to be transmitted over two consecutive radio block periods (e.g., BLOCK 0 could be used to transmit 6 radio blocks of data and BLOCK 1 could be used to transmit 6 radio blocks of data) and the mobile station 102 would not be provided with any idle time since every radio block period would carry some data needing to be received and decoded by the mobile station 102.

In the illustrated example of FIGS. 11 and 12, maximum radio block quantities (e.g., the maximum 20 radio blocks) are specified over groupings of two radio block periods, each forming a separate one of the multiple downlink radio block period intervals 1102. In other example implementations, such maximum radio block quantities may be specified over groupings of more radio block periods. In addition, to allow a receiving device (e.g., the mobile station 102) to process data received over a single radio block period grouping (e.g., one of the multiple downlink radio block period intervals 1102), an access network (e.g., the access network 104) may, during one or more subsequent radio block periods, transmit no additional data intended for the receiving device. Since reception of data blocks may temporarily exceed the processing capabilities of the mobile station 102, the mobile station 102 may be permitted additional time to process some or all radio blocks, with correspondingly modified requirements on, for example, the maximum time between receipt of a radio block and the reflection of its status (received/not received) in ACK/NACK information transmitted by the mobile station 102. In some example implementations, the access network 104 may send zero radio blocks of data in some radio block periods (and make the mobile station 102 aware of this in advance) by using a partial assignment (e.g., a partial assignment using the partial timeslot assignment structure 400 of FIG. 4). In some example implementations, similar techniques may be employed in connection with uplink transmissions.

Although FIGS. 11 and 12 describe maximum radio block quantities specified over groupings of two or more radio block periods based on capabilities of the mobile station 102, in some example implementations, maximum radio block quantities may be applied in a similar manner for communications from the mobile station 102 to the access network 104. In such example implementations, the access network 104 may be constrained based on processing capabilities or other, secondary capabilities of the access network interface 108 (or other network devices). The access network 104 may inform the mobile station 102 of such constraints or capabilities, and the mobile station 102 may use the techniques described in connection with FIGS. 11 and 12 to transmit data to the access network 104 based on a maximum radio block quantity of data that the access network 104 is able to receive over two or more radio block periods and/or based on other, secondary capabilities of the access network 104.

Figure 13:
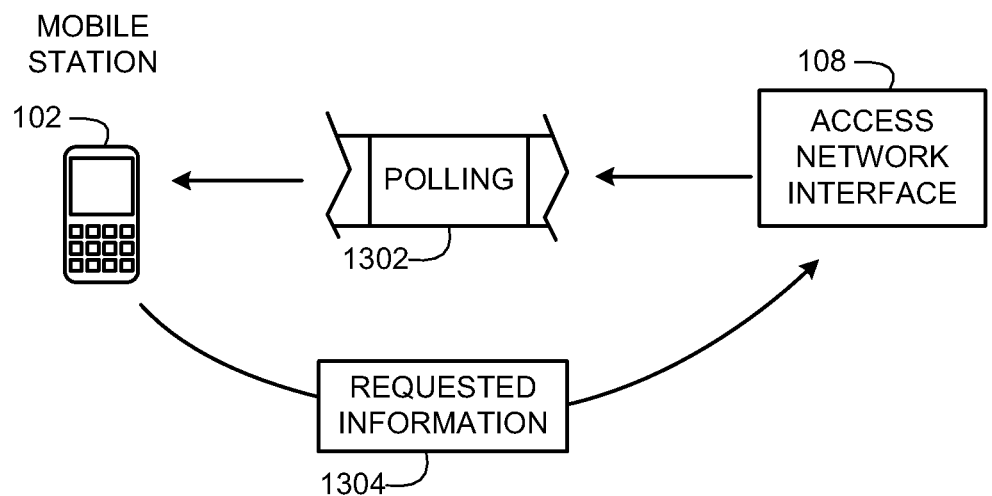
FIG. 13 depicts a portion of an example control message containing a polling field used by a network to poll a mobile station for information.

FIG. 13 depicts an example polling field 1302 transmitted by the access network interface 108 to the mobile station 102 on a downlink PDCH to request control information and/or ACK/NACK information (e.g., requested information 1304) from the mobile station 102. In legacy GSM/GPRS systems, access networks poll mobile stations using different polling codes representing uplink radio block allocations to the mobile stations and the type of information that is being requested from the mobile stations. When implemented in connection with EGPRS systems, the polling field 1302 may be a Combined EGPRS Supplementary/Polling (CES/P) field. The example methods and apparatus described herein for partial assignments may be used in connection with polling processes.

In some example implementations, the response to a poll is to be transmitted within a radio block period, where the radio block period is determined by taking into account the partial assignment of the mobile station 102 (and, preferably, but not necessarily, the radio block period in which the poll was received and, optionally, the contents of the polling field 1302) rather than solely based on the position of the radio block period in which the poll was received and the contents of the polling field 1302, as is done in known systems. For example, according to known standards, a poll may indicate an allocation to the mobile station 102 (or, alternatively, that a response is to be transmitted by the mobile station 102) in a radio block period that is two block periods after the radio block period in which the poll was received at the mobile station 102. However, using the example techniques described herein, a poll may be used to indicate an allocation in a radio block period that is the $J^{th}$ (e.g., second) radio block period (of radio block periods indicated by a previous and still valid partial assignment) after the radio block period in which the poll is received by the mobile station 102. For example, different polling codes may represent different values of J. Preferably, but not necessarily, this approach may be used when the previous and still valid partial assignment for the mobile station 102 includes one or more uplink assignments. Alternatively, a poll may indicate an allocation in a radio block period that is valid according to either a previous and still valid uplink assignment or a previous and still valid downlink assignment. However, this approach may also be used when the mobile station 102 has no valid uplink assignment, but does have a previous and still valid downlink assignment.

In some example implementations, the access network 104 may use legacy polling codes for communication to the mobile station 102 in the polling field 1302, but the mobile station 102 is configured to ignore any allocation indicated by such legacy polling codes that does not match radio block periods previously identified by the access network 104 using any one or more of the partial assignment techniques described herein. For example, the access network 104 may communicate a partial assignment to the mobile station 102 using any of the techniques described herein. As long as such partial assignment is valid, the mobile station 102 can ignore any polls from the access network 104 that do not specify a radio block period matching a previously indicated partial assignment (including the union of two or more such assignments) that is still valid. Preferably, but not necessarily, when the mobile station 102 has a partial uplink assignment, this approach may be used and a previous and still valid partial assignment relates to one or more uplink assignments. Alternatively, the access network 104 may specify a radio block period that is valid according to either a previous and still valid uplink assignment or a previous and still valid downlink assignment. However, this approach may also be used when the mobile station 102 has no valid uplink assignment, but does have a previous and still valid downlink assignment.

Additionally or alternatively, the access network 104 may be configured to communicate polling codes to the mobile station 102 via the polling field 1302 without such polling codes specifying any resource allocation to the mobile station 102 to be used for a response from the mobile station 102. In some example implementations, the polling codes may optionally be used to indicate only a type of information that the access network 104 is requesting from the mobile station 102. In some example implementations, upon receiving a polling code in the polling field 1302 from the access network 104, the mobile station 102 interprets the receipt of the polling code as meaning that it should respond to the access network 104 on a subsequent (and preferably, but not necessarily, the next) available uplink radio block that is allocated to it by the access network using any of the assignment and resource allocation techniques described herein or already known in the art. In such example implementations, the mobile station 102 may optionally decode the polling code to identify the requested information 1304.

FIGS. 14-18 and 23 depict example flow diagrams representative of processes that may be implemented using, for example, computer readable instructions that may be used to implement partial assignments and/or allocations of network resources to enable communications between networks (e.g., the access network 104 of FIG. 1) and mobile stations (e.g., the mobile station 102 of FIGS. 1, 5-8, 12, and 13). The example processes of FIGS. 14-18 and 23 may be performed using one or more processors, controllers, and/or any other suitable processing devices. For example, the example processes of FIGS. 14-18 and 23 may be implemented using coded instructions (e.g., computer readable instructions) stored on one or more tangible computer readable media such as flash memory, read-only memory (ROM), and/or random-access memory (RAM). As used herein, the term tangible computer readable medium is expressly defined to include any type of computer readable storage and to exclude propagating signals. Additionally or alternatively, the example processes of FIGS. 14-18 and 23 may be implemented using coded instructions (e.g., computer readable instructions) stored on one or more non-transitory computer readable media such as flash memory, read-only memory (ROM), random-access memory (RAM), cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIGS. 14-18 and 23 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 14-18 and 23 may be implemented manually or as any combination(s) of any of the foregoing techniques, for example, any combination of firmware, software, discrete logic and/or hardware. Further, although the example processes of FIGS. 14-18 and 23 are described with reference to the flow diagrams of FIGS. 14-18 and 23, other methods of implementing the processes of FIGS. 14-18 and 23 may be employed. For example, the order of execution of the blocks may be changed, and/or some of the blocks described may be changed, eliminated, sub-divided, or combined. Additionally, any or all of the example processes of FIGS. 14-18 and 23 may be performed sequentially and/or in parallel by, for example, separate processing threads, processors, devices, discrete logic, circuits, etc.

Figure 14:
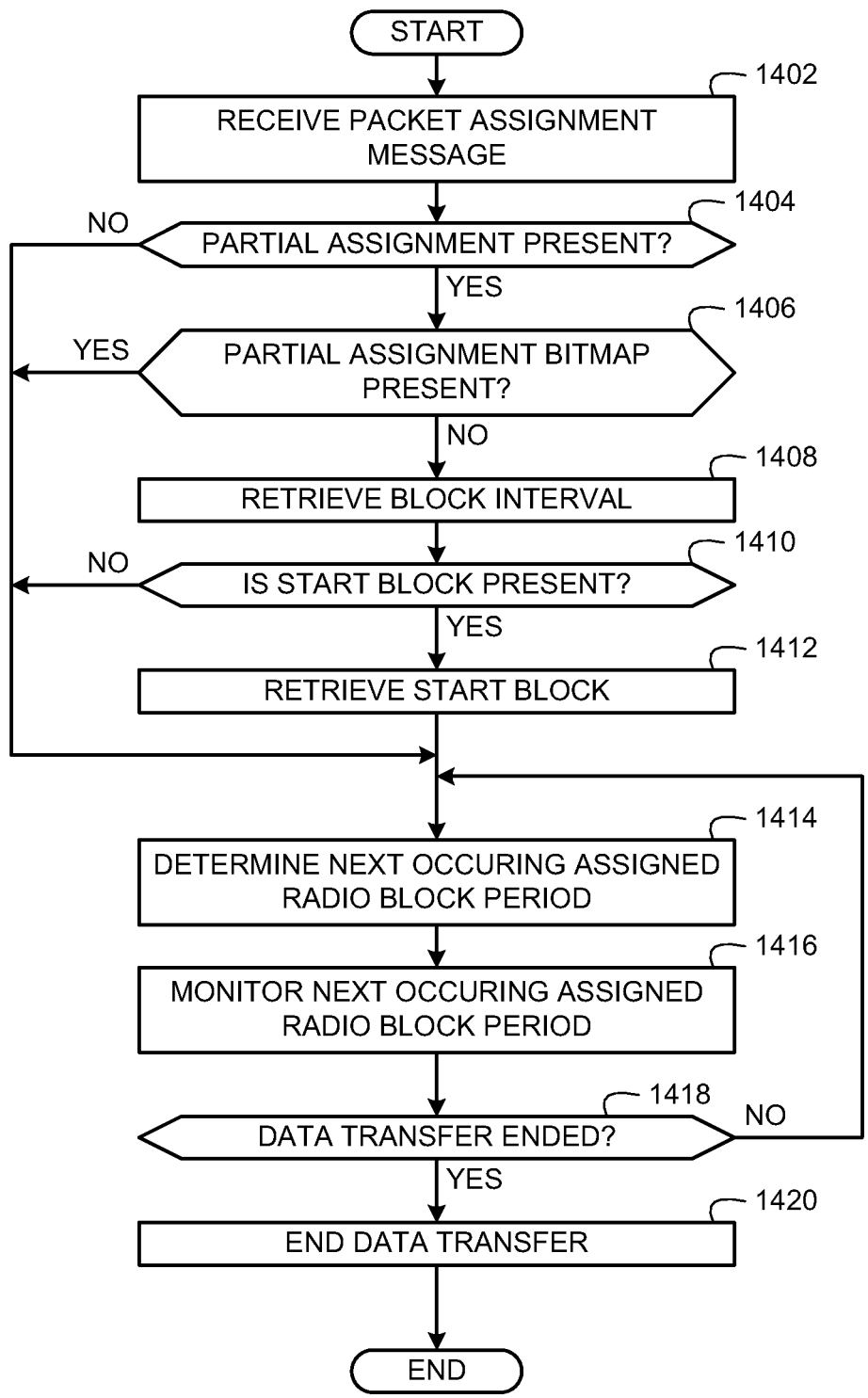
FIG. 14 depicts an example flow diagram representative of computer readable instructions that may be used to employ a partial assignment data structure of FIG. 4 to identify assigned radio block periods.

Turning now to FIG. 14, a depicted example flow diagram representative of computer readable instructions may be used to employ the partial assignment data structure 400 of FIG. 4 to identify assigned radio block periods (e.g., the radio block periods 302*a-c* of FIG. 3). Initially, the mobile station 102 receives a packet assignment message (block 1402). In the illustrated example, the mobile station 102 may receive the packet assignment message from the access network 104 (FIG. 1), and the packet assignment message may contain the one-in-N assignment fields 502 or the bitmap assignment fields 602 of the partial timeslot assignment structure 400 of FIG. 4. In some instances, the packet assignment message may not contain a partial assignment, but may instead contain an assignment according to legacy assignment techniques. The mobile station 102 determines whether the packet assignment message contains a partial assignment (block 1404). If the packet assignment contains a partial assignment, the mobile station 102 determines whether the packet assignment message contains a partial assignment bitmap (block 1406). For example, a partial assignment bitmap may be in the form of the bitmap assignment fields 602 described above in connection with FIG. 6. In the illustrated example, the mobile station 102 may determine whether the packet assignment message includes a partial assignment bitmap by determining whether the first bit in the received partial timeslot assignment structure 400 is set to one (1).

If the packet assignment message does not include a partial assignment bitmap (block 1406), the packet assignment message may include a one-in-N partial assignment, and control advances to block 1408. At block 1408, the mobile station 102 retrieves a block interval from the packet assignment message. For example, the mobile station 102 may retrieve a block interval value from the block interval field 504 of FIG. 5. The mobile station 102 determines whether the packet assignment message includes a start block value (block 1410). For example, the packet assignment message may include a start block value in the start block field 506 of FIG. 4. If the packet assignment message includes the start block value, the mobile station 102 retrieves the start block value from the packet assignment message (block 1412).

After the mobile station 102 retrieves the start block value (block 1412) or if the packet assignment message includes a partial assignment bitmap (block 1406) or if the packet assignment message does not include a partial assignment (block 1404), control advances to block 1414. At block 1414, the mobile station 102 determines a next occurring assigned radio block period (e.g., one of the radio block periods 302*a-c* of FIG. 3). For example, if the packet assignment message includes a partial assignment but does not include a partial assignment bitmap, the mobile station 102 may determine the next occurring assigned radio block period based on the block interval value retrieved at block 1408 and, if present, the start block value retrieved at block 1412, as described above in connection with FIG. 5. If the packet assignment message includes a partial assignment bitmap, the mobile station 102 may determine the next occurring assigned radio block period based on a repeat length value stored in the repeat length field 604 and an assignment bitmap stored in the assignment bitmap field 606 as described above in connection with FIG. 6. Otherwise, if the packet assignment message does not include a partial assignment, the mobile station 102 may determine a next occurring assigned radio block period based on a legacy assignment technique. In the illustrated example, depending on the type of packet assignment message received at block 1402 (e.g., a PACKET UPLINK ASSIGNMENT message, a PACKET DOWNLINK ASSIGNMENT message, or a PACKET TIMESLOT RECONFIGURE message), the next occurring assigned radio block period may be an uplink radio block period or a downlink radio block period, or the next occurring assigned radio block period may indicate assigned uplink and downlink radio block periods at a particular radio block period position.

The mobile station 102 then monitors (and/or processes) downlink communications either in the next occurring radio block period assigned for downlink communications, or in the next radio block period during which uplink allocation indicators (e.g., the USF value 802 of FIG. 8 or the USF values 902 of FIG. 9) may be received which allocate resources in an assigned radio block period for uplink communications (block 1416). The mobile station 102 then determines whether a data transfer (e.g., a TBF connection) has ended (block 1418). If the data transfer session (e.g., a TBF connection) has not ended, control returns from block 1418 to block 1414. Otherwise, the data transfer session is ended (block 1420) by, for example, the mobile station 102 or the access network 104 and the example process of FIG. 14 ends.

Figure 15:
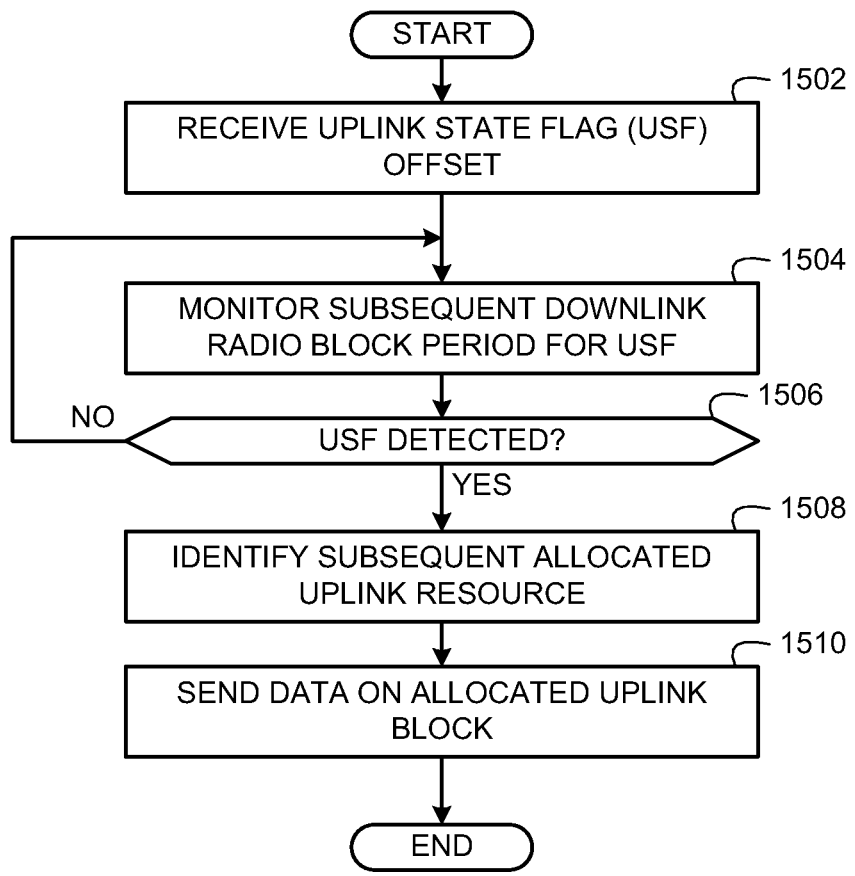
FIG. 15 depicts an example flow diagram representative of computer readable instructions that may be used to identify allocated uplink resources based on an uplink state flag (USF) offset and received USF values of FIGS. 7-9.

FIG. 15 depicts an example flow diagram representative of computer readable instructions that may be used to identify allocated uplink resources based on an uplink state flag (USF) offset (e.g., a USF offset value in the USF offset field 702 of FIG. 7) and received USF values (e.g., the USF values 802 of FIG. 8 or 902 of FIG. 9). Initially, the mobile station 102 receives a USF flag offset value (block 1502) in, for example, the USF offset field 702. The mobile station 102 then monitors a subsequent downlink radio block period for a USF value corresponding to it (block 1504).

In some example implementations, at block 1504, the mobile station 102 may monitor (and/or process) radio blocks during every downlink radio block period and determine whether it contains a USF value corresponding to the mobile station 102 at block 1504. Alternatively, at block 1504, the mobile station 102 may monitor (and/or process) radio blocks only during those downlink radio block periods that have been previously assigned to the mobile station 102 using a partial assignment for downlink communications such as either of the partial assignment techniques of FIGS. 5 and 6 if these are the same radio block periods as those in which uplink allocation indicators (e.g., USF values that allocate resources in an assigned radio block period for uplink communications) may be received. In this manner, the mobile station 102 can monitor, for USF values, only during downlink radio block periods (e.g., the downlink radio block periods 906*a*-*c* of FIG. 9) that may also contain data sent by the access network 104 as described above in connection with FIG. 9, and the mobile station 102 may advantageously operate in lower power modes during non-assigned radio block periods.

The mobile station 102 determines whether it has detected a USF value corresponding to it in the monitored downlink radio block period (block 1506). If the mobile station 102 does not detect a corresponding USF value (block 1506), control returns to block 1504. Otherwise, if the mobile station 102 does detect a corresponding USF value (block 1506), the mobile station 102 identifies a subsequent allocated uplink resource (e.g., one of the allocated uplink radio blocks 904*a*-*b* of FIG. 9) (block 1508). For example, the mobile station 102 may identify the subsequent allocated uplink resource based on the downlink radio block period position of the USF value detected at block 1506 and the USF offset value received at block 1502 as described above in connection with FIGS. 7-9.

The mobile station 102 sends data to the access network 104 in the allocated uplink resource(s) (e.g., one of the allocated uplink radio blocks 904*a*-*b*) (block 1510). The example process of FIG. 15 then ends. Of course, the mobile station 102 may continue to monitor downlink radio block periods and perform the operations of blocks 1504, 1506, 1508, and 1510 as described above to send further data to the access network 104.

Figure 23:
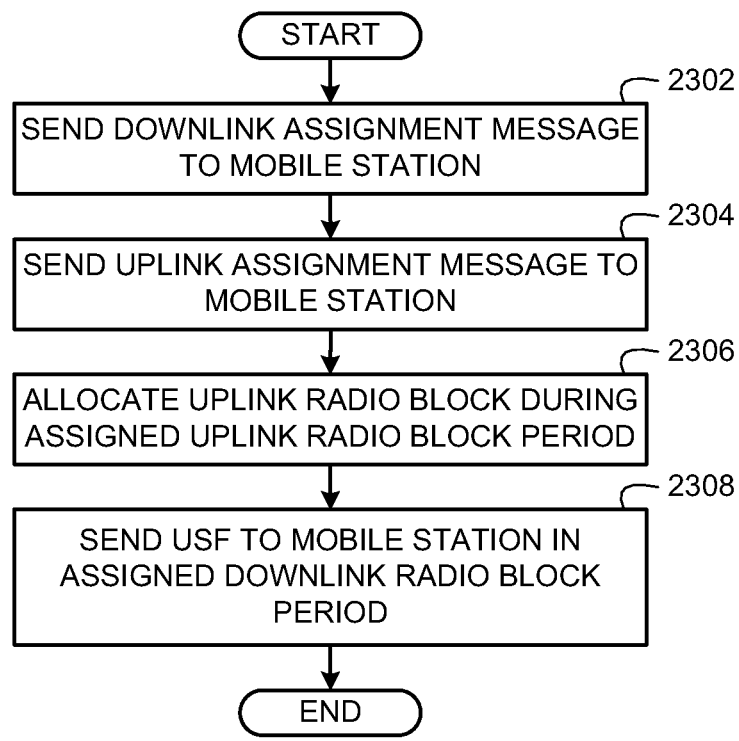
FIG. 23 depicts an example flow diagram representative of computer readable instructions that may be used by an access network to send indications of uplink resource allocations to a mobile station during assigned downlink radio block periods using the USF values of FIG. 9.

FIG. 23 depicts an example flow diagram representative of computer readable instructions that may be used by the access network 104 to send indications of uplink resource allocations to the mobile station 102 during assigned downlink radio block periods (e.g., the downlink radio block periods 906*a*-*c* of FIG. 9) using the USF values 902 of FIG. 9. Initially, the access network interface 108 sends a downlink assignment message to the mobile station 102 (block 2302). The downlink assignment message may include a partial assignment based on either of the one-in-N partial assignment technique or the bitmap partial assignment technique described above in connection with FIGS. 4-6, or any other radio block period assignment technique. If the downlink assignment message includes a partial assignment based on either of the one-in-N partial assignment technique or the bitmap partial assignment technique described above in connection with FIGS. 4-6, at least one radio block period (e.g., the downlink radio block period 906*a*) assigned by the partial assignment is separated from a next occurring radio block period (e.g., the downlink radio block period 906*b*) also assigned by the partial assignment by one or more non-assigned radio block period (e.g., the downlink radio block periods 907*a*-*b* of FIG. 9).

The access network interface 108 sends an uplink assignment message to the mobile station 102 (block 2304). The uplink assignment message may include a partial assignment based on either of the one-in-N partial assignment technique or the bitmap partial assignment technique described above in connection with FIGS. 4-6, or any other radio block period assignment technique. If the uplink assignment message includes a partial assignment based on either of the one-in-N partial assignment technique or the bitmap partial assignment technique described above in connection with FIGS. 4-6, at least one radio block period (e.g., the uplink radio block period 908*a*) assigned by the partial assignment is separated from a next occurring radio block period (e.g., the uplink radio block period 908*b*) also assigned by the partial assignment by one or more non-assigned radio block period (e.g., the uplink radio block periods 909*a*-*b* of FIG. 9).

The access network interface 108 allocates an uplink radio block (e.g., the uplink radio block 904*a* or the uplink radio block 904*b*) to the mobile station 102 to occur during an assigned uplink radio block period (e.g., the uplink radio block period 908*a* or the uplink radio block period 908*b*) (block 2306). The access network interface 108 sends a USF (e.g., the USF 902 of FIG. 9) to the mobile station 102 in an assigned downlink radio block period (e.g., one or more of the downlink radio block periods 906*a*-*c* of FIG. 9) (block 2308). The example process of FIG. 23 then ends.

Figure 16:
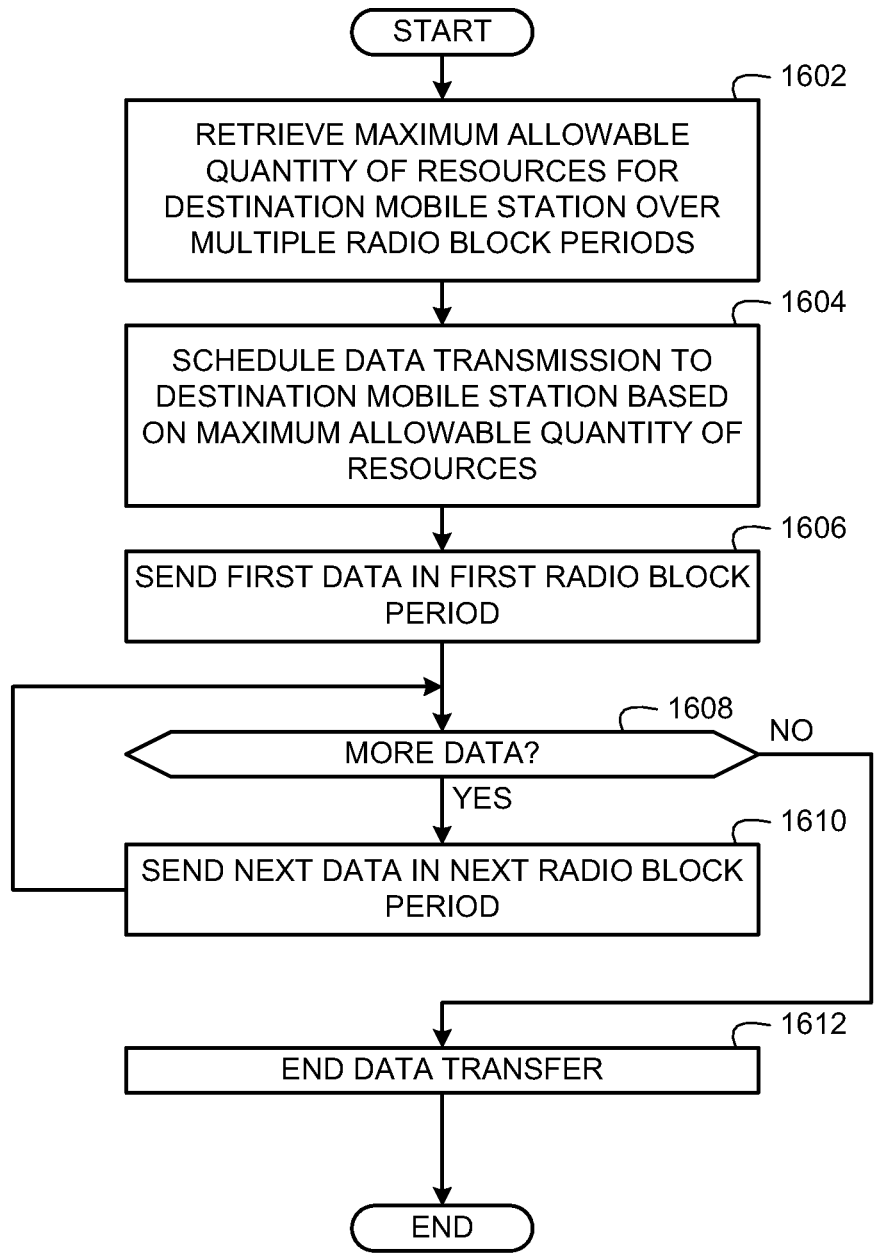
FIG. 16 depicts an example flow diagram representative of computer readable instructions that may be used to send data to a mobile station using a maximum cumulative quantity of resources allowable over multiple downlink radio blocks.

FIG. 16 depicts an example flow diagram representative of computer readable instructions that may be used to send data to the mobile station 102 using a maximum cumulative quantity of resources allowable over multiple downlink radio block periods as described above in connection with FIGS. 11 and 12. Initially, the access network interface 108 (FIGS. 1 and 12) retrieves a maximum allowable quantity of resources (e.g., radio blocks) for a destination mobile station (e.g., the mobile station 102) over multiple radio block periods (block 1602), such as, one of the multiple downlink radio block period intervals 1102 of FIG. 11. In some example implementations, the access network interface 108 may retrieve radio access capabilities (RAC) information from the mobile station 102 or from the core network 106 indicating the maximum cumulative quantity of resources that the mobile station 102 is capable of receiving over a multiple downlink radio block period interval 1102 (e.g., two or more radio block periods). For example, as described in connection with FIGS. 11 and 12, the mobile station 102 may be capable of receiving, and thus processing, 20 radio blocks of data during two consecutive downlink radio block periods forming the multiple downlink radio block period interval 1102. In some example implementations, this may be indicated by an indication in the RAC of the mobile station 102 that the maximum cumulative quantity of resources that the mobile station 102 is capable of receiving over a multiple downlink radio block period interval 1102 is specified by a receive sum (Rx_Sum) parameter (e.g., an example Rx_Sum parameter defined in 3GPP TS 45.002 v. 9.3.0 which, in known systems, corresponds to a single radio block period) multiplied by a quantity of radio block periods in the multiple downlink radio block period interval 1102.

The access network interface 108 then schedules a data transmission to the destination mobile station 102 based on the maximum allowable quantity of resources (block 1604). For example, the access network interface 108 may schedule portions of data to be sent in each downlink radio block period of a particular multiple downlink radio block period interval 1102 so that all schedule data portions do not exceed the maximum allowable quantity of resources during the multiple downlink radio block period interval 1102. The access network interface 108 may additionally take into account restrictions that apply on a per-TDMA frame basis or per-radio block basis, which may also be determined based on the RAC of the mobile station 102.

The access network interface 108 sends first data in a first downlink radio block (block 1606). For example, the access network interface 108 may use 12 radio blocks to send data in a downlink radio block period BLOCK 0 as shown in FIG. 12 or use any other quantity of radio blocks. The access network interface 108 determines whether it has more data to send to the mobile station 102 (block 1608). If the access network interface 108 has more data to send (block 1608), the access network interface 108 sends the next data in a next radio block period of the same multiple downlink radio block period interval 1102 (block 1610) and control returns to block 1608.

If the access network interface 108 does not have any more data to send (block 1608), the access network interface 108 may end the data transfer (block 1612). For example, the access network interface 108 may end a TBF. In some example implementations, the data transfer may end, while the TBF is not ended. The example process of FIG. 16 then ends.

Figure 17:
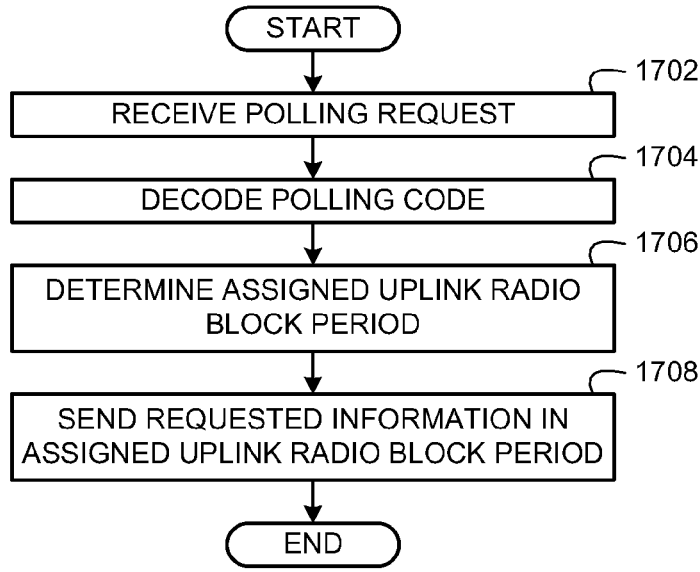
FIG. 17 depicts an example flow diagram representative of computer readable instructions that may be used to identify allocated uplink radio blocks based on the polling request of FIG. 13 received from a network.

FIG. 17 depicts an example flow diagram representative of computer readable instructions that may be used to identify allocated uplink radio blocks based on the polling request 1302 of FIG. 13 received from the access network interface 108. Initially, the mobile station 102 receives the polling request 1302 (block 1702) and decodes a polling code contained therein (block 1704). In the illustrated example of FIG. 17, the polling code indicates the type of information that the access network 104 is requesting from the mobile station 102. In some example implementations of the example process of FIG. 17, the polling code may also indicate a radio block period in which the mobile station 102 is to respond to the polling request by sending the requested information 1304 (FIG. 13) to the access network interface 108. In other example implementations of the example process of FIG. 17, the polling code may indicate the type of information requested from the mobile station 102 but may not indicate a radio block period. In such example implementations, the mobile station 102 uses a previous partial assignment to identify uplink radio block periods assigned to the mobile station 102 and uses those identified uplink radio block periods to send the requested information 1304 to the access network interface 108. The previous partial assignment may be made using, for example, either of the one-in-N partial assignment technique or the bitmap partial assignment technique described above in connection with FIGS. 4-6, or any other radio block period assignment technique.

The mobile station 102 determines an assigned uplink radio block period in which to send the requested information 1304 to the access network interface 108 (block 1706). As discussed above, the polling code may explicitly indicate the radio block period for use by the mobile station 102 in sending the requested information 1304 (e.g., with reference to an existing, valid assignment), or the polling code may not have such an indication, in which case the mobile station 102 may refer to a previous partial assignment of radio block periods made by the access network 104.

The mobile station 102 sends the requested information 1304 in the assigned uplink radio block period (block 1708), and the example process of FIG. 17 ends.

Figure 18:
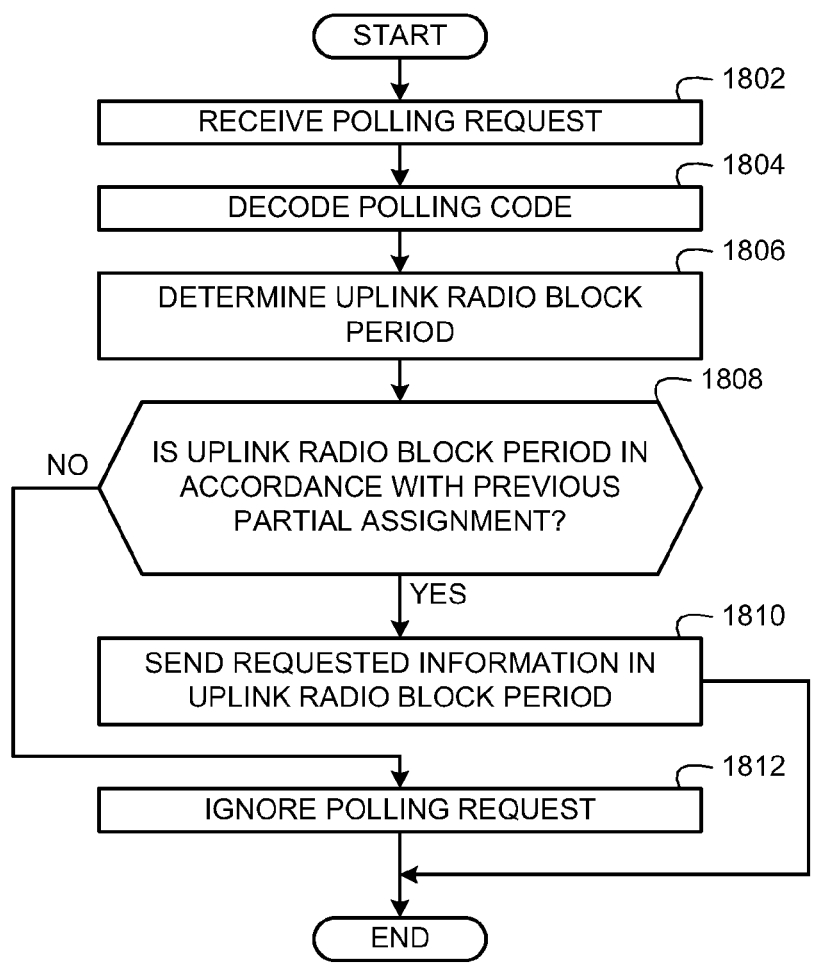
FIG. 18 depicts another example flow diagram representative of computer readable instructions that may be used to identify allocated uplink radio blocks based on the polling request of FIG. 13 received from a network.

FIG. 18 depicts another example flow diagram representative of computer readable instructions that may be used to identify allocated uplink radio blocks based on the polling request 1302 of FIG. 13 received from a network. Initially, the mobile station 102 receives the polling request 1302 (block 1802) and decodes a polling code contained therein (block 1804). In the illustrated example of FIG. 18, the polling code indicates the type of information that the access network 104 is requesting from the mobile station 102 and also indicates an uplink radio block period during which the mobile station 102 is expected to send the requested information 1304 (FIG. 13) to the access network interface 108.

The mobile station 102 determines an uplink radio block period (block 1806) based on the polling code decoded at block 1804. The mobile station 102 determines whether the uplink radio block period is in accordance with a radio block period indicated by a previous, and still valid, partial assignment (block 1808) made by, for example, the access network 104. For example, the radio block period indicated by the polling code may or may not match a radio block period of a previous, and still valid, partial assignment made by the access network 104 using, for example, either of the one-in-N partial assignment technique or the bitmap partial assignment technique described above in connection with FIGS. 4-6, or any other radio block period assignment technique.

If the uplink radio block period indicated by the polling code decoded at block 1804 does match a radio block period (e.g., an uplink radio block period) of a previous, and still valid, partial assignment (block 1808), the mobile station 102 sends the requested information 1304 in the radio block period indicated by the decoded polling code (block 1810). Otherwise, if the radio block period indicated by the polling code decoded at block 1804 does not match a radio block period of a previous, and still valid, partial assignment, the mobile station 102 ignores the polling request 1302 (block 1812).

After ignoring the polling request (block 1812) or after sending the requested information (block 1810), the example process of FIG. 18 ends.

Figure 19:
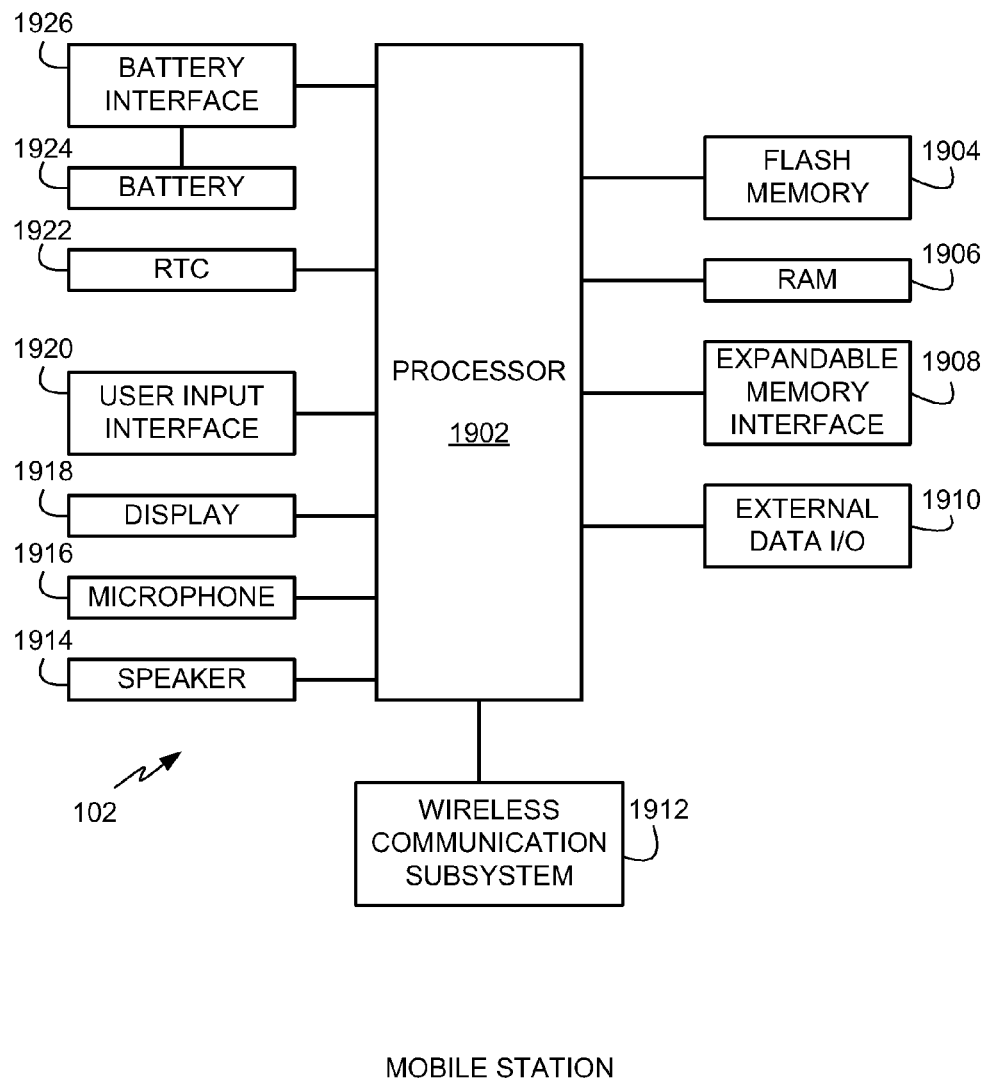
FIG. 19 depicts an example block diagram of the mobile station of FIGS. 1, 5-8, 12, and 13 that can be used to implement the example methods and apparatus disclosed herein.

Now turning to FIG. 19, an illustrated example of the mobile station 102 of FIGS. 1, 5-8, 12, and 13 is shown in block diagram form. In the illustrated example, the mobile station 102 includes a processor 1902 that may be used to control the overall operation of the mobile station 102. The processor 1902 may be implemented using a controller, a general purpose processor, a digital signal processor, dedicated hardware, or any combination thereof.

The example mobile station 102 also includes a FLASH memory 1904, a random access memory (RAM) 1906, and an expandable memory interface 1908 communicatively coupled to the processor 1902. The FLASH memory 1904 can be used to, for example, store computer readable instructions and/or data. In some example implementations, the FLASH memory 1904 may be used to store instructions that may be executed to cause the processor 1902 to implement one or more operations associated with one or more of the example processes of FIGS. 14-18 and 23. The RAM 1906 may be used to, for example, store data and/or instructions. The mobile station 102 is also provided with an external data I/O interface 1910. The external data I/O interface 1910 may be used by a user to transfer information to and from the mobile station 102 through a wired medium.

The mobile station 102 is provided with a wireless communication subsystem 1912 to enable wireless communications with wireless networks such as mobile communication networks, cellular communications networks, wireless local area networks (WLANs), etc. To enable a user to use and interact with or via the mobile station 102, the mobile station 102 is provided with a speaker 1914, a microphone 1916, a display 1918, and a user input interface 1920. The display 1918 can be an LCD display, an e-paper display, etc. The user input interface 1920 could be an alphanumeric keyboard and/or telephone-type keypad, a multi-direction actuator or roller wheel with dynamic button pressing capability, a touch panel, etc.

The mobile station 102 is also provided with a real-time clock (RTC) 1922 to track durations of timeslots, radio blocks, or radio block periods and/or to implement time-based and/or date-based operations. In the illustrated example, the mobile station 102 is a battery-powered device and is, thus, provided with a battery 1924 and a battery interface 1926.

Figure 20:
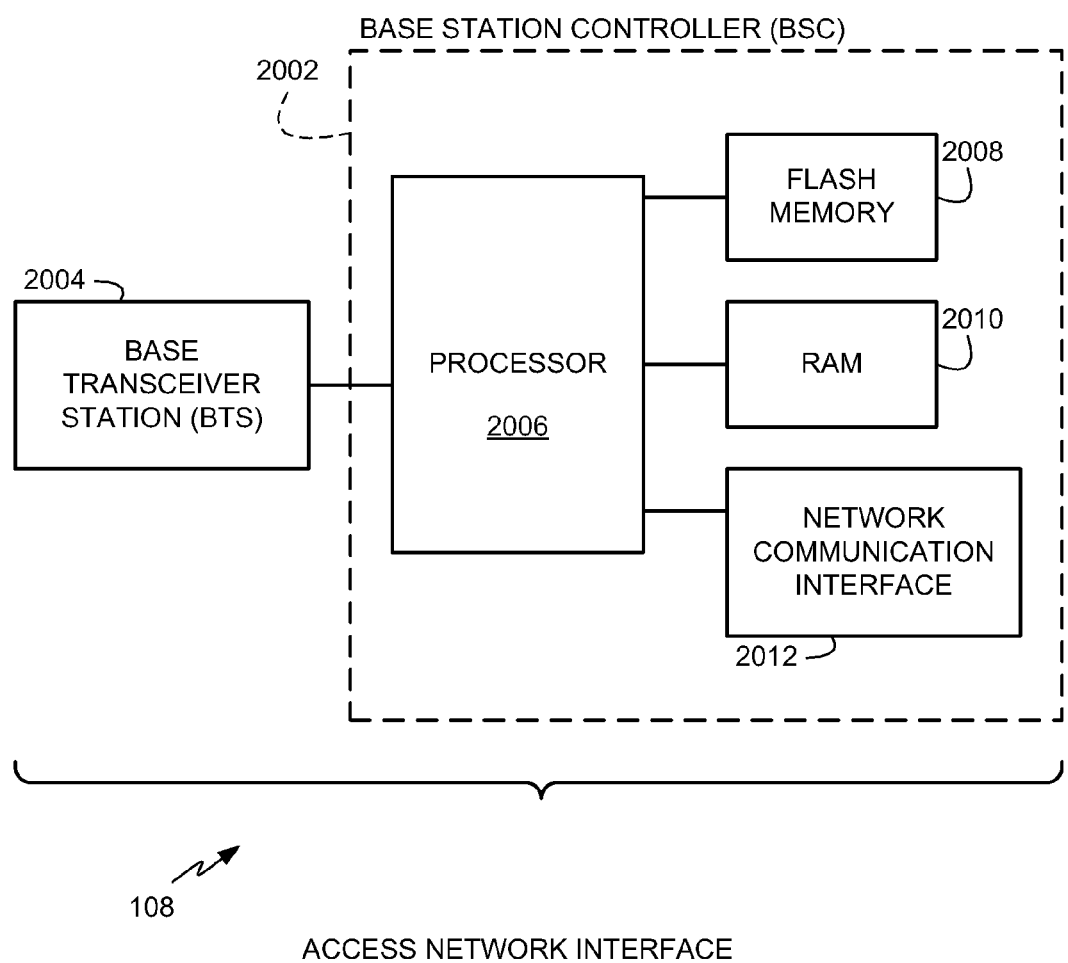
FIG. 20 depicts an example block diagram of the access network interface of FIGS. 1, 5-8, 12, 13, and 22 that can be used to implement the example methods and apparatus disclosed herein.

Turning now to FIG. 20, the example access network interface 108 of FIGS. 1, 5-8, 12, and 13 is shown in block diagram form. The access network interface 108 a base station controller (BSC) 2002 communicatively coupled to a base transceiver station (BTS) 2004. In the illustrated example, the BSC 2002 is connected to the core network 106 and implements operations and processes associated with a packet control unit (PCU) for a GSM/EDGE (Enhanced Data rates for GSM Evolution) radio access network (GERAN). In the illustrated example, the BTS 2004 is in communication with the BSC 2002 and connected to an antenna to communicate wirelessly with mobile station such as the mobile station 102 of FIGS. 1, 5-8, 12, 13, and 19.

In the illustrated example of FIG. 20, the BSC 2002 includes a processor 2002 to perform the overall operations of the BSC 2002. In addition, the BSC 2002 includes a FLASH memory 2008 and a RAM 2010, both of which are coupled to the processor 2006. The FLASH memory 2008 may be configured to store instructions that may be executed to cause the processor 2006 to implement one or more operations associated with one or more of the example processes of FIGS. 14-18 and 23. The RAM 2010 may be used to store data to be exchanged between a core network (e.g., the core network 106 of FIG. 6) and mobile stations (e.g., the mobile station 102). In addition, the RAM 2010 may be used to store radio access capabilities (RACs) of mobile stations including, for example, a maximum allowable cumulative quantity of timeslots that can be processed by a mobile station within the time corresponding to a multiple downlink radio block period interval 1102 of FIG. 11.

To communicate with a core network (e.g., the core network 106), the BSC 2002 is provided with a network communication interface 2012. In the illustrated example, the network communication interface 2012 is configured to communicate with a GSM/GERAN core network. In other example implementations, the network communication interface 2012 may be configured to communicate with any other type of network including a 3GPP network, a code division multiple access (CDMA) network, etc.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method to communicate data to a mobile station based on maximum allowable resources across a plurality of radio block periods, comprising:

identifying a first quantity of resources for use in communicating first data to a mobile station and a second quantity of resources for use in communicating second data to the mobile station, a total quantity of the first and second quantities of resources equal to a maximum allowable cumulative quantity of resources across a plurality of radio block periods including first and second radio block periods, and the maximum allowable cumulative quantity of resources specifying that both of the first and second data are communicatable in one of (1) the first radio block period exclusive of the second radio block period or (2) the second radio block period exclusive of the first radio block period; and sending, to the mobile station, the first data and the second data in at least one of the first radio block period or the second radio block period.

2. A method as defined in claim 1, wherein the total quantity of the first and second quantities of resources comply with one or more second constraints associated with sending data to the mobile station.

3. A method as defined in claim 2, wherein the one or more second constraints include at least one of an Rx value, a Tx value, a switching time constraint, or a sum parameter value.

4. A method as defined in claim 1, wherein the maximum allowable cumulative quantity of resources is based on a maximum quantity of data that can be processed by the mobile station during the plurality of radio block periods.

5. A method as defined in claim 1, wherein the plurality of radio block periods includes only the first and second radio block periods.

6. A method as defined in claim 1 further comprising receiving capabilities information from the mobile station, the capabilities information indicating the maximum allowable cumulative quantity of resources across the plurality of radio block periods.

7. An apparatus to communicate data to a mobile station based on maximum allowable resources across a plurality of radio block periods, comprising:

a processor configured to:

identify a first quantity of resources for use in communicating first data to a mobile station and a second quantity of resources for use in communicating second data to the mobile station, a total quantity of the first and second quantities of resources equal to a maximum allowable cumulative quantity of resources across a plurality of radio block periods including the first and second radio block periods, and the maximum allowable cumulative quantity of resources specifying that both of the first and second data are communicatable in one of (1) exclusively the first radio block period or (2) exclusively the second radio block period; and send, to the mobile station, the first data and the second data in at least one of the first radio block period or the second radio block period.

8. An apparatus as defined in claim 7, wherein the total quantity of the first and second quantities of resources comply with one or more second constraints associated with sending data to the mobile station.

9. An apparatus as defined in claim 8, wherein the one or more second constraints include at least one of an Rx value, a Tx value, a switching time constraint, or a sum parameter value.

10. An apparatus as defined in claim 7, wherein the maximum allowable cumulative quantity of resources is based on a maximum quantity of data that can be processed by the mobile station during the plurality of radio block periods.

11. An apparatus as defined in claim 7, wherein the resources are radio blocks.

12. An apparatus as defined in claim 7, wherein the processor operates in at least one of a Global System for Mobile communications (GSM) network, a General Packet Radio Service (GPRS) network, or an Enhanced GPRS (EGPRS) network.

13. An apparatus as defined in claim 7, wherein the plurality of radio block periods includes only the first and second radio block periods.

14. An apparatus as defined in claim 7, wherein the processor is configured to receive capabilities information from the mobile station, the capabilities information indicating the maximum allowable cumulative quantity of resources across the plurality of radio block periods.

15. An apparatus to communicate capabilities associated with a mobile station, comprising:

a processor configured to:

send capabilities information associated with a mobile station to a network, the capabilities information indicating a maximum allowable cumulative quantity of resources that the mobile station is capable of processing across a quantity of downlink radio block periods assigned to the mobile station; and receive data at the mobile station from the network using all of the maximum allowable cumulative quantity of resources in one or more radio block periods, the one or more downlink radio blocks periods being less than the quantity of downlink radio block periods.

16. An apparatus as defined in claim 15, wherein the maximum allowable cumulative quantity of resources complies with one or more second constraints associated with sending data to the mobile station.

17. An apparatus as defined in claim 16, wherein the one or more second constraints include at least one of an Rx value, a Tx value, a switching time constraint, or a sum parameter value.

18. An apparatus as defined in claim 15, wherein the maximum allowable cumulative quantity of resources is based on a maximum quantity of data that can be processed by the mobile station during the plurality of radio block periods.

19. An apparatus as defined in claim 15, wherein the resources are radio blocks.

20. An apparatus as defined in claim 15, wherein the network is at least one of a Global System for Mobile communications (GSM) network, a General Packet Radio Service (GPRS) network, or an Enhanced GPRS (EGPRS) network.

* * * * *

UNITED STATES PATENT AND TRADEMARK OFFICE
CERTIFICATE OF CORRECTION

| | | |
|---|---|---|
| PATENT NO. | : 9,001,649 B2 | Page 1 of 1 |
| APPLICATION NO. | : 12/841868 | |
| DATED | : April 7, 2015 | |
| INVENTOR(S) | : David Philip Hole et al. | |

It is certified that error appears in the above-identified patent and that said Letters Patent is hereby corrected as shown below:

Claims

Column 30, Line 13, In Claim 15, delete "blocks" and insert -- block --, therefor.

Signed and Sealed this
Twenty-fourth Day of November, 2015

Michelle K. Lee
*Director of the United States Patent and Trademark Office*